(12) United States Patent
Shimizu et al.

(10) Patent No.: US 9,056,602 B2
(45) Date of Patent: Jun. 16, 2015

(54) VEHICLE BRAKE DEVICE

(71) Applicant: ADVICS CO., LTD., Kariya (JP)

(72) Inventors: Hiroshi Shimizu, Kariya (JP); Hiroaki Niino, Toyota (JP); Shigemitsu Nohira, Kariya (JP)

(73) Assignee: ADVICS CO., LTD., Kariya, Aichi-Pref (JP)

( * ) Notice: Subject to any disclaimer, the term of this patent is extended or adjusted under 35 U.S.C. 154(b) by 32 days.

(21) Appl. No.: 13/840,018

(22) Filed: Mar. 15, 2013

(65) Prior Publication Data

US 2014/0265546 A1 Sep. 18, 2014

(30) Foreign Application Priority Data

Mar. 30, 2012 (JP) .................. 2012-081764

(51) Int. Cl.
*B60T 13/00* (2006.01)
*B60T 13/68* (2006.01)
*B60T 7/04* (2006.01)
*B60T 13/14* (2006.01)
*B60T 13/66* (2006.01)

(52) U.S. Cl.
CPC .............. *B60T 13/686* (2013.01); *B60T 7/042* (2013.01); *B60T 13/146* (2013.01); *B60T 13/662* (2013.01)

(58) Field of Classification Search
USPC ............... 303/20, 3, 15, 113.3, 114.1, 114.2, 303/115.1, 116.1, 119.1, 152, 155, 158; 188/72.4, 152, 156, 158; 60/548, 562, 60/563, 566
See application file for complete search history.

(56) References Cited

U.S. PATENT DOCUMENTS

| 8,342,615 | B2 * | 1/2013 | Drumm ..................... 303/20 |
|---|---|---|---|
| 2002/0084691 | A1 * | 7/2002 | Isono et al. .................. 303/10 |
| 2007/0278855 | A1 * | 12/2007 | Hatano .................. 303/116.1 |
| 2008/0257670 | A1 * | 10/2008 | Drumm et al. ............. 188/358 |
| 2011/0285199 | A1 | 11/2011 | Ishida |
| 2013/0057054 | A1 * | 3/2013 | Ishida .......................... 303/3 |
| 2013/0127238 | A1 * | 5/2013 | Masuda et al. ............ 303/6.01 |
| 2014/0250883 | A1 * | 9/2014 | Maruyama et al. ......... 60/591 |

FOREIGN PATENT DOCUMENTS

| JP | 2009-507714 A | 2/2009 |
|---|---|---|
| JP | 2011-226541 A | 11/2011 |
| JP | 2011-240873 | 12/2011 |

OTHER PUBLICATIONS

U.S. Appl. No. 13/850,041, filed Mar. 25, 2013, Masaki Masuyama.
U.S. Appl. No. 13/777,795, filed Feb. 26, 2013, Yosuke Kuki et al.
Japanese Office Action issued Dec. 12, 2014, by the Japan Patent Office, in corresponding Japanese Patent Application No. 2012-081764 with English translation of Japanese Office Action(4 pages).

* cited by examiner

*Primary Examiner* — Pamela Rodriguez
(74) *Attorney, Agent, or Firm* — Buchanan Ingersoll & Rooney PC

(57) ABSTRACT

A vehicle brake device is provided with a regulator for generating a servo pressure acting on a master piston in a master cylinder, based on a pilot pressure. The regulator is provided with a brake fluid absorbing section communicating with a first pilot chamber for absorbing the brake fluid as the pilot pressure in the first pilot chamber in the quantity depending on the fluid pressure in the first pilot chamber. The brake fluid absorbing section comprises a piston receiving portion formed in a second piston and opening to the first pilot chamber, a pressure receiving piston slidably received in the piston receiving portion and making the first pilot chamber variable in capacity, and an urging member urging the pressure receiving piston toward the first pilot chamber side.

8 Claims, 6 Drawing Sheets

42

41

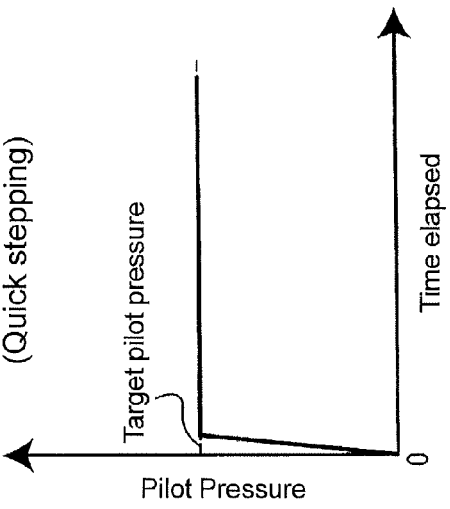
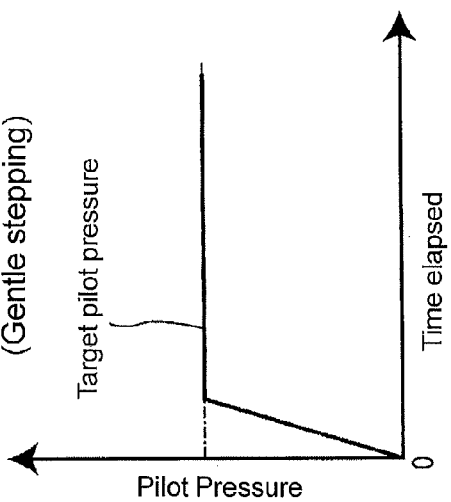
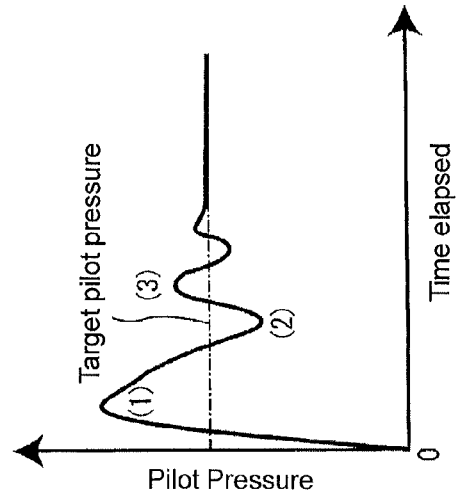

VEHICLE BRAKE DEVICE

INCORPORATION BY REFERENCE

This application is based on and claims priority under 35 U.S.C. 119 with respect to Japanese Application No. 2012-081764 filed on Mar. 30, 2012, the entire content of which is incorporated herein by reference.

BACKGROUND OF THE INVENTION

1. Field of the Invention

The present invention relates to a vehicle brake device for applying a friction brake force to a vehicle.

2. Discussion of the Related Art

Heretofore, as one example of vehicle brake devices that apply a friction brake force to a vehicle, there has been known a vehicle brake device shown in FIGS. 11 and 12 of JP2011-240873 A (equivalent of US2011/0285199 A1), for example. In a master cylinder of the vehicle brake device, an input piston and a master piston are held to be separated with a predetermined space therebetween, and when the input piston is moved, a demand brake force is calculated in dependence on the moving amount of the input piston, and a demand friction brake force is calculated by subtracting a demand regenerative brake force from the demand brake force. Then, a pilot pressure corresponding to the demand friction brake force is generated by an electromagnetic valve connected to an accumulator and is inputted to a regulator, which then generates a servo pressure depending on the pilot pressure. Then, the servo pressure is applied to the master piston to move the same, and the a master pressure is generated in a maser chamber to be applied to wheel cylinders, whereby the demand friction brake force is generated.

Electromagnetic valves have a property that is difficult to control the pressure on a downstream side unless a certain degree of flow quantity is supplied as the fluid passing through the electromagnetic valve. However, brake fluid is an incompressible fluid, and thus, when the brake fluid passing through the electromagnetic valve is extremely little in flow quantity, the pilot pressure to the regulator overreacts to the operation of the electromagnetic valve. For this reason, there is an anxiety that when the electromagnetic valve is opened to raise the pilot pressure, the pilot pressure raises abruptly and overshoots a desired pilot pressure. Like this, in the vehicle brake device in the prior art, it is difficult to control the pilot pressure accurately, and hence, a problem arises in that the servo pressure and the master pressure are difficult to control accurately.

SUMMARY OF THE INVENTION

Accordingly, it is a primary object of the present invention to provide an improved vehicle brake device having a master cylinder in which an input piston and a master piston are held separated from each other with a predetermined space therebetween, and being capable of accurately controlling a pilot pressure used in generating a servo pressure.

Briefly, according to the present invention, there is provided a vehicle brake device for supplying brake fluid to a wheel cylinder of a friction brake provided for a wheel of a vehicle to generate a friction brake force on the wheel by the friction brake. The vehicle brake device comprises a cylinder; a master piston arranged in the cylinder slidably in an axial direction and having a pressuring piston portion defining a master chamber that pressurizes brake fluid supplied to the wheel cylinder, together with an internal surface of the cylinder and a servo pressure receiving portion defining a servo pressure chamber together with the internal surface of the cylinder; an accumulating section that accumulates the brake fluid in a pressurized state; an electromagnetic valve that uses the brake fluid from the accumulating section to generate a pilot pressure; a regulator provided with a first piston that is slidably arranged in a housing and that partitions the interior of the housing into a first pilot chamber communicating with the electromagnetic valve and a servo pressure generating chamber communicating with the servo pressure chamber, and a valve mechanism that makes the servo pressure generating chamber communicate selectively with the accumulating section and a reservoir in dependence on the movement of the first piston; and a brake fluid absorbing section that communicates with the first pilot chamber and that absorbs the brake fluid of a quantity depending on the fluid pressure in the first pilot chamber.

With this construction, the brake fluid absorbing section absorbs the brake fluid of the quantity depending on the fluid pressure in the first pilot chamber. Thus, when the electromagnetic valve is opened to raise the fluid pressure in the first pilot chamber, brake fluid is absorbed by the brake fluid absorbing section, and thus, brake fluid flows through the electromagnetic valve. Therefore, the flow of brake fluid of a quantity that is sufficient for the electromagnetic valve to control the pilot pressure is secured at the time of generating the pilot pressure, so that it is possible to accurately control the pilot pressure that is used in generating the servo pressure by the electromagnetic valve.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 6:
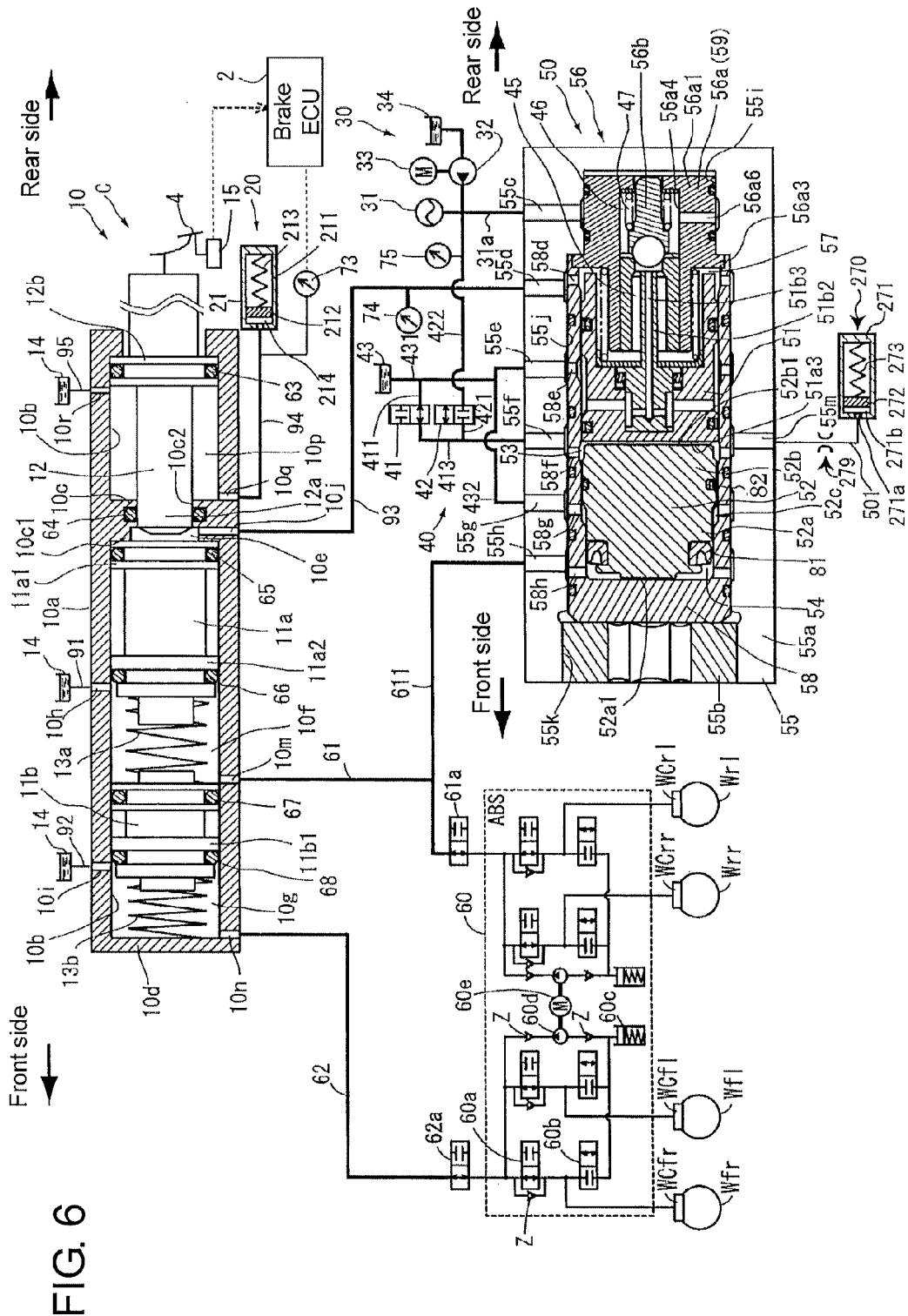

FIGS. 5(A), 5(B) and 5(C) are graphs showing the relation between the time elapsed from the beginning of stepping a brake pedal and a pilot pressure in the prior art and in the present embodiment; and FIG. 6 is a view partly in section showing the construction of a vehicle brake device in a second embodiment according to the present invention.

DETAILED DESCRIPTION OF THE PREFERRED EMBODIMENTS

First Embodiment

Hybrid Vehicle equipped with Friction Brake Device

Hereinafter, a first embodiment of the present invention will be described with reference to the drawings. A hybrid vehicle equipped with a friction brake device B (vehicle brake device) in the present embodiment is a vehicle of the type that an engine and a motor generator (both not shown) drive left and right front wheels Wfl, Wfr being driving wheels, for example. The motor generator constitutes a regenerative brake device. The regenerative brake device causes the motor generator to generate on the left and right front wheels Wfl, Wfr a regenerative brake force depending on a target regenerative brake force described later. The motor generator can take a construction wherein a motor and a generator are independent.

In the vicinity of respective wheels Wfl, Wfr, Wrl, Wrr, there are provided brake discs (not shown) rotating bodily with respective wheels Wfl, Wfr, Wrl, Wrr and friction brakes (not shown) that press brake pads on the brake discs to generate a friction brake force set as a target. The friction brakes are provided with wheel cylinders WCfl, WCfr, WCrl, WCrr that press the brake pads on the brake discs at a master pressure Pm generated by a master cylinder 10 described later (refer to FIG. 1). At this time, a target friction brake force set as a target is calculated by a brake ECU 2 described later by subtracting the aforementioned target regenerative brake force from a target brake force that is determined based on the stepping amount of a brake pedal 4 (refer to FIG. 1) stepped by the driver.

(Friction Brake Device)

Figure 1:
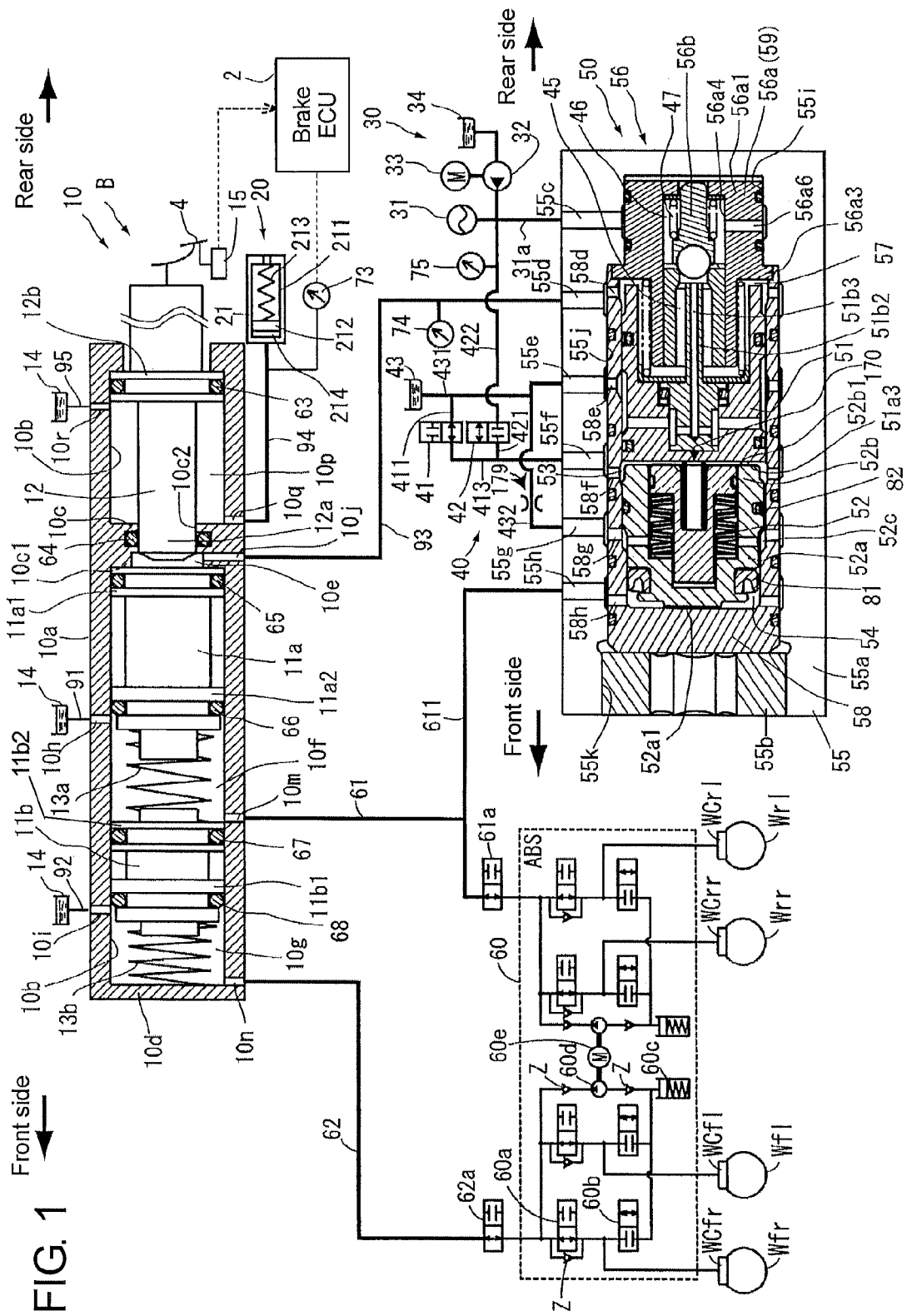
FIG. 1 is a view partly in section showing the construction of a vehicle brake device in a first embodiment according to the present invention.

As shown in FIG. 1, the friction brake device B (vehicle brake device) in the present embodiment is provided mainly with the master cylinder 10, a reaction force generating unit 20, an accumulating device 30, a pilot pressure generating device 40, a regulator 50, an ABS 60, the brake ECU 2, and respective sensors 15, 73-75 being able to communicate electrically with the brake ECU 2. In this embodiment, the accumulating device 30, the pilot pressure generating device 40, the regulator 50 and the like constitute a servo pressure generating device for generating a servo pressure Ps.

(Master Cylinder)

As shown in FIG. 1, the master cylinder 10 has a cylinder 10a taking a bottomed, cylindrical shape opening on the right side in FIG. 1, an input piston 12 received in the cylinder 10a, a first master piston 11a, a second master piston 11b, a reaction force pressure chamber 10p, a servo pressure chamber 10e, a first master chamber 10f, a spring 13a, a spring 13b and a second master chamber 10g. Hereinafter, description will be made regarding the left side in FIG. 1 of the master cylinder 10 as front side and the right side as rear side.

At a middle part in the axial direction of the internal surface of the cylinder 10a, there is formed a partition wall 10c that protrudes radially inward over the whole circumference to be smaller in inside diameter than other parts of the internal surface.

The first master piston 11a is arranged in the cylinder 10a on the front side of the partition wall 10c slidably in the axial direction. A pressurizing piston portion 11a2 is formed at the front end portion of the first master piston 11a. A servo pressure receiving portion 11a1 is formed at the rear end portion of the first master piston 11a. A servo pressure chamber 10e is defined by the internal surface of the cylinder 10a, the partition wall 10c, the servo pressure receiving portion 11a1 of the first master piston 11a and an extreme end portion 12a of the input piston 12.

The input piston 12 is a piston that reciprocates in the cylinder 10 in the axial direction through a manipulation amount corresponding to the manipulation of the brake pedal 4, to increase or decrease the capacity of the reaction force pressure chamber 10p. The reaction force pressure chamber 10p is defined by the internal surface (cylinder hole 10b) of the cylinder 10a, the partition wall 10c in the cylinder 10a and a collar portion 12b of the input shaft 12. A seal member 63 being a rubber O-ring for example is arranged between the external surface of the collar portion 12b and the cylinder hole 10b. The seal member 63 fluid-tightly seals the fitting portion between the cylinder hole 10b and the collar portion 12b of the input piston 12.

Further, the input piston 12 has the front extreme end portion 12a fluid-tightly supported in a through hole 10c2 formed on the center of the partition wall 10c through a seal member 64 being a rubber O-ring for example and is arranged behind the rear end surface of the first master piston 11a slidably in the axial direction. The end portion 12a protrudes into the servo pressure chamber 10e and is arranged to be contactable with the rear end surface of the first master piston 11a and to be separated from the same through a predetermined distance. When the input piston 12 is moved forward by the manipulation of the brake pedal 4, the collar portion 12b is also moved forward to decrease the capacity of the reaction force pressure chamber 10p.

With the servo pressure Ps supplied in the servo pressure chamber 10e, the servo pressure chamber 10e is kept in the state that the capacity does not change. Thus, the first master piston 11a begins to move forward with the rear end surface thereof separated from the front end surface of the extreme end portion 12a of the input piston 12. However, with the servo pressure Ps not supplied in the servo pressure chamber 10e, the capacity of the servo pressure chamber 10e is decreased, whereby the front end surface of the extreme end portion 12a of the input piston 12 is brought into contact with the rear end surface of the first master piston 11a and pushes the first master piston 11a forward.

As shown in FIG. 1, the first master chamber 10f (corresponding to "master chamber" in the claimed invention) is defined by the pressurizing piston portion 11a2 of the first master piston 11a, a rear piston portion 11b2 of the second master piston 11b and the cylinder hole 10b (the internal surface of the cylinder 10a). When the first master piston 11a moves forward, the brake fluid supplied to the wheel cylinders WCrl, WCrr is pressurized in the first master chamber 10f to generate the master pressure Pm.

The second master chamber 10g is defined by a pressurizing piston portion 11b1 of the second master piston 11b, a bottom wall 10d of the cylinder 10a and the cylinder hole 10b (the internal surface of the cylinder 10a) and, when the second master piston 11b moves forward, pressurizes the brake fluid to generate the master pressure Pm.

The spring 13a is provided in the first master chamber 10f with itself compressed between the first master piston 11a and the second master piston 11b and urges the first and second master pistons 11a, 11b in a direction to expand the first master chamber 10f. The spring 13b is provided in the second master chamber 10g with itself compressed between the second master piston 11b and the bottom wall 10d and urges the second master piston 11b in a direction to expand the second master chamber 10g.

As shown in FIG. 1, the cylinder 10a of the master cylinder 10 is formed with ports 10h-10i and ports 10m, 10n, 10q and 10r each making the inside of the cylinder 10a communicate with the outside. The port 10h makes the first master chamber 10f communicate through a pipe 91 with a reservoir 14 being at the atmospheric pressure. The port 10i makes the second master chamber 10g communicate with the reservoir 14 through a pipe 92. The port 10h and the port 10i are arranged to open respectively at the front ends of the first and second master pistons 11a, 11b positioned at respective predetermined positions, in other words, to open at respective positions ahead of and close to seal members 66, 68 being, for example, rubber O-rings that fluid-tightly seal the respective fitting portions between the first and second master pistons 11a, 11b and the cylinder hole 10b (the internal surface of the cylinder 10a). The respective positions referred to herein of the first and second master pistons 11a, 11b are defined as follows. That is, the predetermined position of the second master piston 11b means the position where the second master piston 11b is balanced and held stopped by being urged by the springs 13a, 13b in the offset directions when fluid pressure is not supplied in the servo pressure chamber 10e. Further, the predetermined position of the first master piston 11a means the position where the first master piston 11a is contacted at the rear end surface thereof with a stepped portion 10c1 to be stopped by being urged rearward by the spring 13a (refer to FIG. 1).

Like this, the port 10h and the port 10i are arranged ahead of and close to the front ends of the first and second master pistons 11a, 11b held at the respective predetermined positions. Therefore, when the first and second master pistons 11a, 11b begin to move forward, the port 10h and port 10i are closed by the seal members 66 and 68 immediately after the beginning of the movement, so that the first and second master chambers 10f, 10g are blocked from the reservoir 14.

The port 10j makes the servo pressure chamber 10e communicate with a servo pressure generating chamber 57 of the regulator 50 through a pipe 93. The port 10m makes the first master chamber 10f communicate with the wheel cylinders WCrr, WCrl through a pipe 61 and the ABS 60. The port 10n makes the second master chamber 10g communicate with the wheel cylinders WCfr, WCfl through a pipe 62 and the ABS 60.

The ports 10q, 10r extend across the cylinder hole 10b formed behind the partition wall 10c. The port 10q communicates with the reaction force generating unit 20 through a pipe 94. The port 10r is arranged to open ahead of and close to the front end of the collar portion 12b of the input piston 12 in the state that the brake pedal 4 is not stepped on, and makes the reaction force pressure chamber 10p communicate with the reservoir 14 through a pipe 95. Specifically, the port 10r is arranged to open ahead of and close to the front end of the seal member 63 that fluid-tightly seals the fitting portion between the external surface of the collar portion 12b and the cylinder hole 10b (internal surface of the cylinder 10a). Thus, when the brake pedal 4 is stepped on to move the input piston 12 forward a predetermined amount, the opening hole of the port 10r opening to the reaction force pressure chamber 10p is closed by the seal member 63 to block the reaction force pressure chamber 10p from the reservoir 14.

The stroke sensor 15 is a sensor arranged in the vicinity of the brake pedal 4 for detecting the manipulation amount (stepping amount) of the brake pedal 4 and transmits the detection result to the brake ECU 2. Since the brake pedal 4 is coupled to the rear end of the input piston 12, the stroke sensor 15 thus detects the moving amount (manipulation amount) in the axial direction of the input piston 12.

The reaction force generating unit 20 is provided with a stroke simulator 21. The stroke simulator 21 is a device that generates a reaction force pressure in the reaction force pressure chamber 10p in correspondence to the manipulation of the brake pedal 4 to produce the manipulation feeling given in conventional brake devices. Generally, the stroke simulator 21 takes a construction that a piston 212 is slidably arranged in a cylinder 211 and that a pilot fluid chamber 214 is formed on the front side of the piston 212 urged forward by a compression spring 213. The stroke stimulator 21 is connected to the reaction force pressure chamber 10p through the pipe 94 and the port 10q. The space receiving the compression spring 213 is in communication with the outside for allowing the movement of the piston 212.

Thus, when the brake pedal 4 is stepped on, the input piston 12 advances, and the port 10r is closed to block the reaction force pressure chamber 10p from the reservoir 14. Then, the brake fluid flows from the reaction force pressure chamber 10p to the stroke stimulator 21 in correspondence to the movement of the input piston 12, and thus, the stroke stimulator 21 generates a reaction force pressure corresponding to the stroke amount, in the reaction force pressure chamber 10p. That is, the stroke stimulator 21 applies the reaction force pressure that corresponds to the manipulation amount (manipulation amount of the brake pedal 4) being the stroke amount of the input piston 12, to the brake pedal 4 coupled to the input piston 12.

The pressure sensor 73 is a sensor for detecting the pressure (reaction force pressure) in the reaction force pressure chamber 10p and is connected to the pipe 94. The signal from the pressure sensor 73 is transmitted to the brake ECU 2.

(Servo Pressure Generating Device)

The accumulating device 30 is a device that supplies the regulator 50 with brake fluid of a high pressure in response to a command from the brake ECU 2. The accumulating device 30 mainly has an accumulator 31 (accumulating section), a hydraulic pump 32, a motor 33 and a reservoir 34 being in the atmospheric pressure state.

The accumulator 31 accumulates the fluid pressure generated by the hydraulic pump 32. The accumulator 31 is connected to the regulator 50, the pressure sensor 75 and the hydraulic pump 32 through a pipe 31a. The hydraulic pump 32 driven by the motor 33 is connected to the reservoir 34 and, when driven by the motor 33, supplies the accumulator 31 with the brake fluid stored in the reservoir 34. The pressure sensor 75 detects the pressure in the accumulator 31.

When the pressure sensor 75 detects that the accumulator pressure goes down to a predetermined value or less, the motor 33 is driven in response to a control signal from the brake ECU 2, so that the hydraulic pump 32 supplies the brake fluid to the accumulator 31 to replenish the pressure energy to the accumulator 31.

The pilot pressure generating device 40 is a device that, in order for the regulator 50 to be able to generate the servo pressure Ps, supplies the regulator 50 with a pilot pressure Pa of a predetermined pressure generated thereby (that is controlled to be equal to the servo pressure Ps in the present embodiment). The magnitude of the predetermined pilot pressure Pa (=Servo Pressure Ps) that the pilot pressure generating device 40 supplies to the regulator 50 is calculated and determined by the brake ECU 2 based on the aforementioned target friction brake force.

(Reducing Valve and Pressure Increase Valve)

The pilot pressure generating device 40 is provided with a reducing valve 41 and a pressure increase valve 42. The reducing valve 41 is an electromagnetic valve of the normally open type and is connected to a reservoir 43 being in the atmospheric pressure state, through a pipe 411 at one side thereof and to a pipe 413 on the other side thereof. Since the reducing valve 41 is controlled by the brake ECU 2, the fluid pressure in the downstream passages is controlled. The construction of the reducing valve 41 will be described later in detail.

The pressure increase valve 42 is an electromagnetic valve of the normally closed type and is connected to a pipe 422 to communicate with the accumulating device 30 on one side thereof and to a pipe 421 connected to the pipe 413. The pressure increase valve 42 is controlled by the brake ECU 2 to control the fluid pressure in the downstream passages.

Figure 4A:
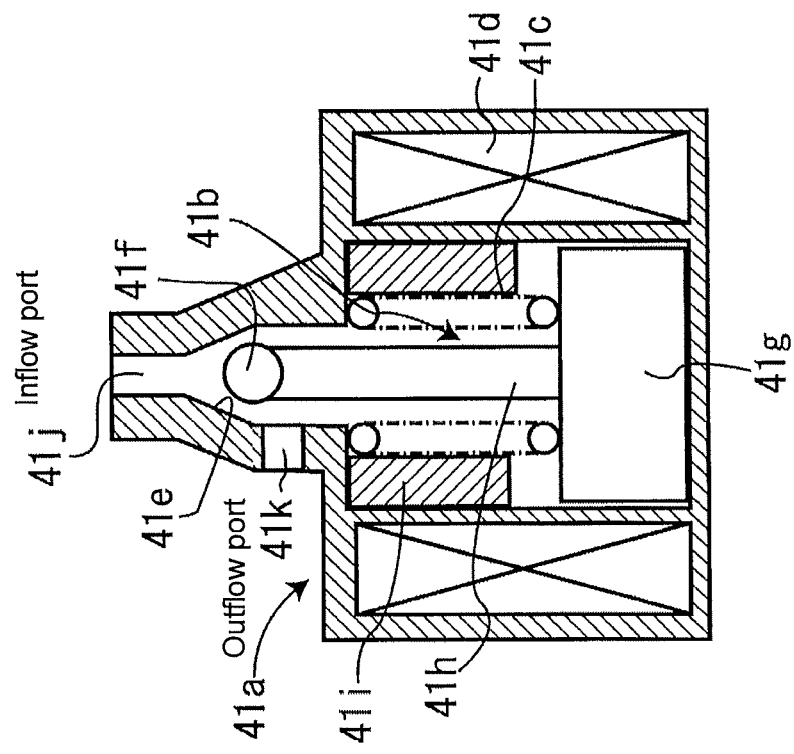
FIG. 4(A) is a sectional view showing a pressure increase valve.

As shown in FIG. 4(A), the pressure increase valve 42 is mainly composed of a main body 42a, a plunger member 42b, an urging member 42c, a coil 42d and a core 42i. The main body 42a is formed inside with a passage extending from an inflow port 42j to an outflow port 42k and is constituted by a non-magnetic material. In the present embodiment, the inflow port 42j is formed at an end of the main body 42a, and the outflow port 42k is formed at a side surface of the main body 42a. A valve seat 42e taking the shape of a conical surface is formed at a part of the passage adjacent to the inflow port 42j. The plunger member 42b is composed of a spherical valve body 42f, an armature 42g of a block shape constituted by a magnetic material such as electromagnetic stainless steel or the like, and a rod 42h connecting the valve body 42f and the armature 42g. The plunger member 42b is slidably arranged inside the main body 42a so that the valve body 42f can closely contact the valve seat 42e.

The coil 42d is provided in the main body 42a on the peripheral side of the armature 42g. The core 42i constituted by a magnetic material such as electromagnetic stainless steel or the like is arranged inside the main body 42a at a position facing the armature 42g and opposite to the inflow port 42j. The urging member 42c such as a coil spring or the like urging the plunger member 42b toward the valve seat 42e side is arranged in the main body 42a. Thus, in the state that the coil 42 is not electrified, the valve body 42f is brought by the urging member 42c into close contact with the valve seat 42e to close the passage formed in the main body 42a.

On the other hand, in the state that the coil 42 is electrified, the armature 42g is attracted toward the core 42i side by the magnetic force generated by the coil 42d. Thus, the force by which the plunger member 42b is pressed on the valve seat 42e side is weakened, and hence, the fluid force acting on the valve body 42f from the inflow side operates to open the passage formed in the main body 42a, whereby the brake fluid flows from the inflow side of the pressure increase valve 42 to the outflow side. At this time, the plunger member 42b is moved to the position where the difference between the pressures applied to the plunger member 42b on the inflow and outflow sides balances with the pressing force by the coil 42d and the urging member 42c (i.e., the resultant force of the electromagnetic attraction force and the urging force). The magnitude of the electric current applied to the coil 42d is adjusted by controlling the duty ratio of the current, and the force that urges the valve body 42f to be pressed on the valve seat 42e changes in dependence on the magnitude of the duty ratio, whereby the pressure difference between the inflow side and the outflow side is varied.

Figure 4B:
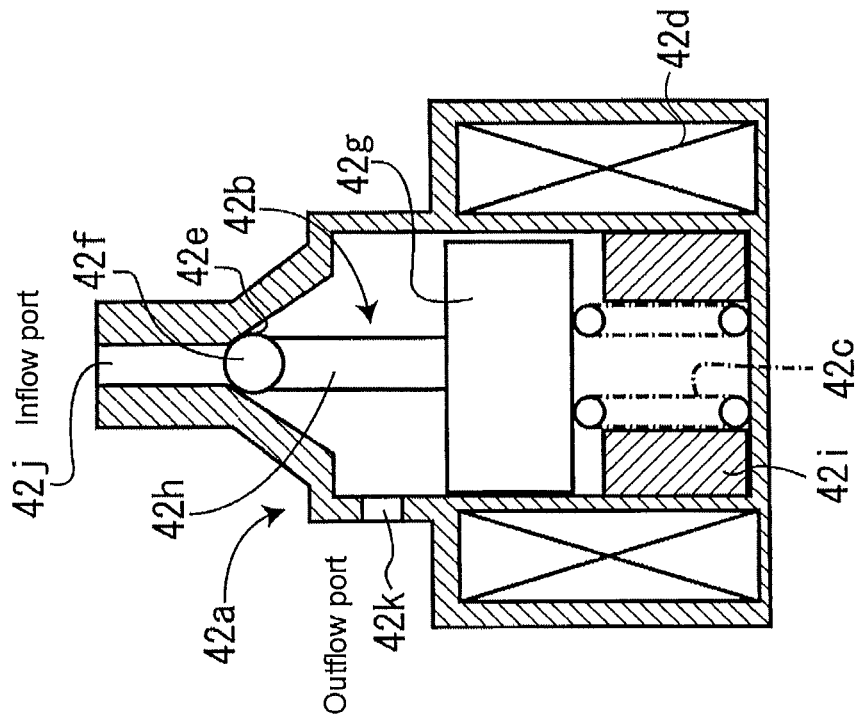
FIG. 4(B) is a sectional view showing a reducing valve.

As shown in FIG. 4(B), the reducing valve 41 is mainly composed of a main body 41a, a plunger member 41b, an urging member 41c, a coil 41d and a core 41i. Since the main body 41a, the plunger member 41b, the urging member 41c and the coil 41d are similar in construction to the main body 42a, the plunger member 42b, the urging member 42c, the coil 42d and the core 42i of the pressure increase valve 42, the respective members composing the reducing valve 41 are designated by respective reference numerals in each of which "1" is subtracted from those in the pressure increase valve 42, and detail description therefor will be omitted. In the reducing valve 41, the urging member 41c urges the plunger member 41b in a direction to be separated from the valve seat 41e. Further, the core 41i is arranged inside the main body 41 on the inflow port 41j side opposite to the armature 41g. In the state that the coil 41d is not electrified, the valve body 41f is separated by the urging member 41c from the valve seat 41e to open the passage formed in the main body 41a. In the state that the coil 41d is electrified, on the other hand, the armature 41g is attracted toward the core 41i by the magnetic force generated by the coil 41d to slide the plunger member 41b toward the inflow side, whereby the valve body 41f closes the valve seat 41e to block the passage formed in the main body 41a.

(Regulator)

Figure 2:
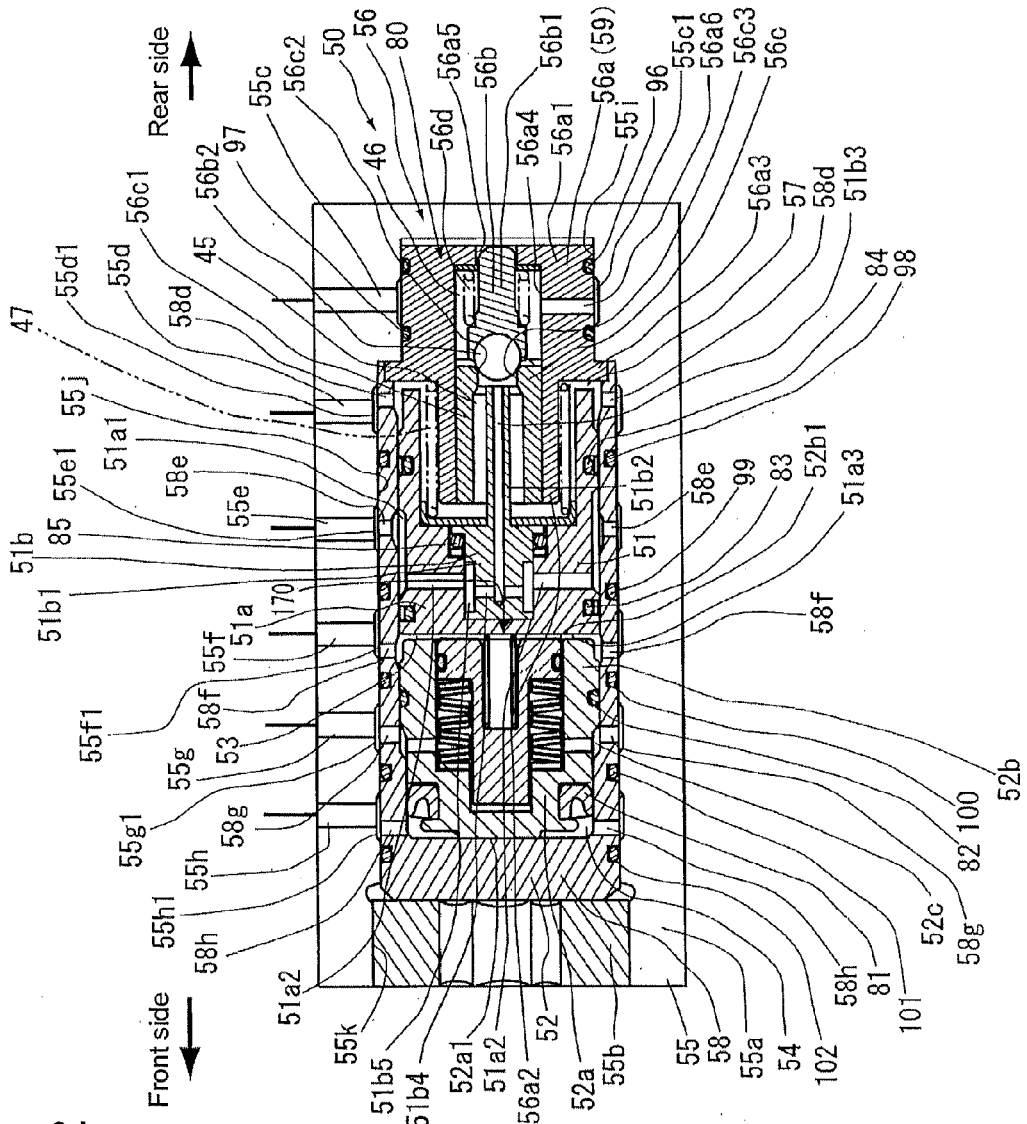
FIG. 2 is a sectional view showing the construction of a regulator in the first embodiment.

The regulator 50 regulates the pressure in the servo pressure chamber 10e of the master cylinder 10 by supplying or discharging the pilot pressure Pa mainly with respect to a first pilot chamber 53. As shown in FIGS. 1 and 2, the regulator 50 is mainly provided with a housing 55, a first piston 51, a second piston 52, a first pilot chamber 53, a second pilot chamber 54, a valve mechanism 56, the servo pressure generating chamber 57 and a brake fluid absorbing section 170. In the present embodiment, the second pilot chamber 54, the second piston 52, the first pilot chamber 53 and the first piston 51 are arranged in the first case 58 that is a generally cylindrical bottomed member having a bottom surface on the front side, in order from the bottom side. The valve mechanism 56 is constructed in a second case 59 also used as a valve housing 56a of the valve mechanism 56 and is secured to the opening side of the first case 58. The first case 58, together with the housing 55, corresponds to "housing" in the claimed invention.

A sub assembly 80 is constituted by the first and second cases 58, 59 fixed bodily. The servo pressure generating chamber 57 is defined by a space enclosed between the first case 58 and the second case 59. Then, the sub assembly 80 is inserted into the housing 55, and an opening portion of the housing 55 is closed by a cap member 55b, referred to later, that is screwed thereinto, so that the regulator 50 is constructed. Hereinafter, description will be made regarding the left side in FIGS. 1 and 2 of the regulator 50 as front side and the right side as rear side.

The housing 55 is provided with a housing body 55a of a generally cylindrical bottomed shape having a bottom surface on the rear side and the aforementioned cap member 55b closing the opening on the front side of the housing body 55a by being screwed thereinto. The aforementioned cap member 55b is in contact at its rear end surface with the front end surface of the sub assembly 80 to press the sub assembly 80 on the bottom side of the housing body 55a. In the embodiment, the cap member 55b is a screw having a hexagon hole at the center thereof. The housing body 55a is formed with a plurality of ports 55c-55h each making the inside communicate with the outside.

The port 55c is connected to the pipe 31a. The port 55d is connected to the pipe 93. The port 55e is connected to a pipe 431 communicating with the reservoir 43. The port 55f is connected to the pipe 413. The port 55g is connected to a pipe 432 connected to the pipe 431. The port 55h is connected to a pipe 611 branching from the pipe 61. The pipe 432 is provided thereon with a flow restricting portion such as an orifice 179 or the like that is smaller in section than other parts thereof.

The interior of the housing body 55a is defined by a small diameter portion 55i receiving the valve mechanism 56 of the sub assembly 80, a medium diameter portion 55j receiving the first case 58 of the sub assembly 80 and a large diameter screw portion 55k into which the cap member 55b is screwed, as arranged in order from the bottom side.

A communication passage 55c1 having a predetermined width in the axial direction of the housing body 55a is engraved at a position to which the port 55c opens on the internal surface of the small diameter portion 55i, over the whole circumference. Further, a communication passage 55*d*1, a communication passage 55*e*1, a communication passage 55*f*1, a communication passage 55*g*1 and a communication passage 55*h*1 each having a predetermined width in the axial direction of the housing body 55*a* are engraved at respective positions to which the ports 55*d*-55*h* respectively open on the internal surface of the medium diameter portion 55*j*, over the whole circumference. The first case 58 is arranged in the medium diameter portion 55*j* of the housing body 55*a* as a result that the first case 58 is inserted with the opening side directed as the lead side.

In this manner, the first piston 51 partitions the interior of the first case 58 into the first pilot chamber 53 and the servo pressure generating chamber 57 (refer to FIGS. 1 and 2) communicating with the servo pressure chamber 10*e*. The second piston 52 is arranged in the first case 58 to be able to contact or be separated from the first piston 51 and partitions the interior of the first case 58 into the first pilot chamber 53 and the second pilot chamber 54 communicating with the first master chamber 10*f*.

The first case 58 is formed with a plurality of ports 58*d*-58*h* each making the inside communicate with the outside. Since the first case 58 is arranged in the housing body 55*a*, the ports 58*d* make the servo pressure generating chamber 57 communicate with the communication passage 55*d*1 engraved on the internal surface of the housing body 55*a*. The ports 58*e* make the communication passage 55*e*1 engraved on the internal surface of the housing body 55*a* communicate with the communication passage 51*a*1 (atmospheric pressure chamber). The ports 58*f* make the communication passage 55*f*1 engraved on the internal surface of the housing body 55*a* communicate with the first pilot chamber 53.

The ports 58*g* make the communication passage 55*g*1 engraved on the internal surface of the housing body 55*a* communicate with an intermediate atmospheric pressure chamber 52*c* shown in FIG. 2. Further, the ports 58*h* make the communication passage 55*h*1 engraved on the internal surface of the housing body 55*a* communicate with the second pilot chamber 54. Although in the present embodiment, the ports 58*d*-58*h* are provided with two for each that are spaced through 180 degrees in the circumferential direction, the present invention is not limited to providing two for each port. Only one port in the circumference suffices to be provided as each of the ports 58*d*-58*h*. Alternatively, three or more ports may be provided in the circumference for each of the ports 58*d*-58*h*.

The second pilot chamber 54 is defined by the bottom surface of the first case 58, the internal surface of the first case 58 and the second piston 52. The second pilot chamber 54 is connected to the pipe 611 through the ports 58*h*, the communication passage 55*h*1 and the port 55*h* to communicate with the first master chamber 10*f* of the master cylinder 10.

The second piston 52 takes a stepped, columnar shape with two diameters including large and small diameters of the external surface and is arranged slidably in the internal surface of the first case 58 in the axial direction. As shown in FIG. 2, a small-diameter columnar portion 52*a* arranged on the bottom side (front side) of the first case 58 is formed to expose an end surface 52*a*1 thereof having an area A to the second pilot chamber 54 side. A large-diameter columnar portion 52*b* is formed to expose an end surface 52*b*1 thereof having an area B to the first pilot chamber 53 side.

Seal members 81, 82 are respectively arranged on the small-diameter columnar portion 52*a* and the large-diameter columnar portion 52*b* to fluid-tightly seal the fitting portions between the internal surface of the first case 58 and the columnar portions 52*a*, 52*b*. Thus, the end surface 52*a*1 of the small-diameter columnar portion 52*a* receives the pressure in the second pilot chamber 54, that is, the master pressure Pm in the first master chamber 10*f*, and thus, the second piston 52 is urged by an urging force Fm (=Pm×A) in the direction toward the first piston 51. Further, the end surface 52*b*1 of the large-diameter columnar portion 52*b* receives the pilot pressure Pa in the first pilot chamber 53 generated by the pilot pressure generating device 40, and thus, the second piston 52 is urged by an urging force Fp (=Pp×B) toward the bottom side of the first case 58. At this time, in the embodiment, the master pressure Pm and the pilot pressure Pa are controlled to the same pressure.

The internal surface of the first case 58 also takes a stepped shape in order to makes the fitting portion between the internal surface of the first case 58 and the second piston 52 fluid-tight. That is, so as to correspond to the small-diameter and large-diameter columnar portions 52*a*, 52*b* of the second piston 52, the internal surface of the first case 58 is formed to be small in diameter on the bottom side and to be larger in diameter at other parts. The aforementioned intermediate atmospheric pressure chamber 52*c* is provided between the second piston 52 and the internal surface of the first case 58 by shifting the stepped position on the internal surface of the first case 58 toward the bottom end side of the first case 58 beyond the stepped position of the second piston 52 in the state that the end surface 52*a*1 of the second piston 52 is in contact with the bottom surface of the first case 58. That is, the intermediate atmospheric pressure chamber 52*c* is provided between the seal members 81, 82. Further, the intermediate atmospheric pressure chamber 52*c* communicates with the ports 58*g* of the first case 58, and the ports 58*g* communicate with the reservoir 43 through the communication passage 55*g*1 and the port 55*g*.

The first piston 51 is arranged in the internal surface of the first case 58 coaxially with the second piston 52 and air-tightly slidably in the axial direction. The first piston 51 is mainly provided with a body portion 51*a* and a control piston 51*b* press-fitted into the body portion 51*a*. The body portion 51*a* is formed to a bottomed cup shape. The outside diameter of the first piston 51 is formed to have the same as the outside diameter of the large-diameter columnar portion 52*b* of the second piston 52. Further, the front end surface 51*a*3 of the body portion 51*a* faces the rear end surface 52*b*1 of the second piston 52, and the first pilot chamber 53 is defined by the front end surface 51*a*3, the rear end surface 52*b*1 and the internal surface of the first case 58.

On the external surface of the body portion 51*a*, seal members 83, 84 are arranged on the first pilot chamber 53 side and the opening side of the first case 58 and air-tightly seal the fitting portion between the internal surface of the first case 58 and the external surface of the body portion 51*a*. The aforementioned communication passage 51*a*1 is provided between the seal members 83, 84 and communicates with the ports 58*e* formed across the first case 58.

The control piston 51*b* has a main body portion 51*b*1 of an almost columnar shape and a protruding portion 51*b*2 of an almost rod shape protruding from the columnar axis center of the main body portion 51*b*1 and being smaller in diameter than the main body portion 51*b*1. The control piston 51*b* is inserted at the external surface of the main body portion 51*b*1 thereof into the internal surface of the body portion 51*a* through a seal member 85 and thus, is movable bodily with the body portion 51*a* in the axial direction.

A passage 51*b*3 drilled from an end portion of the protruding portion 51*b*2 is provided in the main body portion 51*b* and the protruding portion 51*b*2 in the columnar axis direction not to pass through the main body portion 51*b*1. Further, in the main body portion 51*b*1, a passage 51*b*4 is provided extending radially across the passage 51b3 (vertically as viewed in the figure) and opening to the external surface of the main body portion 51b1. Further, a communication passage 51b5 is engraved on the external surface of the main body portion 51b1 over the whole circumference to communicate with the passage 51b4. A passage 51a2 which makes the communication passage 51b5 communicate with the communication passage 51a1 engraved on the external surface of the body portion 51a is provided to extend in the radial direction (vertical direction in the figure).

The protruding portion 51b2 has an outside diameter which is smaller than the inside diameter of a through hole 56c3 of a valve seat portion 56c referred to later and is able to go through the interior of the valve seat portion 56c. The protruding portion 51b2 is arranged coaxially with the through hole 56c3 of the valve seat portion 56c. In the state that the pilot pressure Pa is not supplied to the first pilot chamber 53, the end of the protruding portions 51b2 is separated a predetermined distance from a ball valve 56b2 of a valve body 56b referred to later that is seated on a valve seat 56c2, toward the bottom side of the first case 58.

The valve mechanism 56 opens and closes the valve body 56b with the movement of the first piston 51 to control the communication and broking of the servo pressure generating chamber 57 with the accumulating device 30. At the time of being blocked, the servo pressure generating chamber 57 communicates with the reservoir 43 and is in the atmospheric pressure state. The valve mechanism 56 is provided with the aforementioned valve housing 56a also used as the second case 59, the valve body 56b, the valve seat portion 56c, and a coil spring 56d. The valve housing 56a protrudes a first cylindrical portion 56a1 (large-diameter side) and a second cylindrical portion 56a2 (small-diameter side) that differ in diameter, coaxially in the opposite directions and is provided with a collar portion 56a3 protruding radially outward over the whole circumference, between the first and second cylindrical portions 56a1, 56a2.

The first cylindrical portion 56a1 being bottomed protrudes toward the bottom side of the housing body 55a. The second cylindrical portion 56a2 having an opening protrudes toward the bottom side of the first case 58. A cylindrical hole 56a4 provided in the first and second cylindrical portions 56a1, 56a2 is drilled from the second cylindrical portion 56a2 side to the bottom surface of the first cylindrical portion 56a1. A sliding guide hole 56a5 passes through the center of the bottom portion of the first cylindrical portion 56a1.

Further, a port 56a6 passes through the first cylindrical portion 56a1 from the external surface to the cylindrical hole 56a4. The opening portion on the external surface side of the port 56a6 communicates with the communication passage 55c1 engraved on the internal surface of the small diameter portion 55i in the housing body 55a. Thus, the port 55c communicates with the cylindrical hole 56a4.

The valve body 56b is arranged in the cylindrical hole 56a4 on the first cylindrical portion 56a1 side and is provided with the ball valve 56b2 formed on the end portion thereof and a valve rod 56b1 which is welded to the ball valve 56b2 with its axis intersecting with the center of the ball valve 56b2. The valve rod 56b1 is supported by being inserted into the sliding guide hole 56a5 passing through the bottom portion of the first cylindrical portion 56a1 and is slidable in the longitudinal direction of the valve housing 56a.

As shown in FIG. 2, the valve seat portion 56c is provided with a valve seat member 56c1 and the valve seat 56c2 formed on the valve seat member 56c1. The valve seat member 56c1 takes an almost cylindrical shape and is press-fitted at the cylindrical external surface thereof in the cylindrical hole 56a4 of the valve housing 56a. The press-fitted valve seat member 56c1 is secured with its end surface on the valve seat 56c2 side (right side in FIG. 2) reaching the almost center of the cylindrical hole 56a4 in the axial direction.

The valve seat 56c2 is formed on the rear side of the valve seat member 56c1. The portion forming the valve seat 56c2 has the through hole 56c3 reduced to be smaller in diameter than other internal surface portions of the valve seat member 56c1. The valve seat 56c2 is formed on a taper surface of a conical shape formed between the through hole 56c3 and the rear end surface of the valve seat member 56c1 or on the intersecting portion of the through hole 56c3 with the taper surface.

The ball valve 56b2 is in contact with the valve seat 56c2 on the rear end surface side of the valve seat member 56c1 and partitions the cylindrical hole 56a4 into a space (hereinafter referred to as second space 46) communicating with the accumulating device 30 and receiving the valve body 56b and another space (hereinafter referred to as first space 45) connected to the servo pressure generating chamber 57 communicating with the servo pressure chamber 10e of the master cylinder 10.

The coil spring 56d urges the ball valve 56b2 toward the valve seat 56c2 and is provided in the second space 46 with itself compressed between the valve body 56b and the bottom surface of the valve housing 56a. The valve body 56b has a stepped portion on the valve rod 56b1, and one end surface of the coil spring 56d is seated on the stepped portion (refer to FIG. 2). In this way, by the urging force of the coil spring 56d, the ball valve 56b2 is contacted with and pressured on the valve seat 56c2 to fluid-tightly block the first and second spaces 45, 46 from each other.

As shown in FIG. 2, in the state that the valve mechanism 56 (sub assembly 80) is arranged in the housing 55, the end surface on the rear side of the collar portion 56a3 of the valve housing 56a is brought into contact with a stepped portion joining the small diameter portion 55i and the medium diameter portion 55j in the housing 55 to position the sub assembly 80 in the axial direction. In this state, a predetermined clearance is provided between the rear end surface of the valve housing 56a and the bottom surface of the small diameter portion 55i of the housing 55. By the provision of this clearance, the valve rod 56b1 is movable beyond the rear end surface of the valve housing 56a, so that a necessary stroke amount can be secured for the valve rod 56b1.

The collar portion 56a3 of the valve housing 56a (the second case 59) is press-fitted at the external surface thereof into a press-fitting internal surface provided at the end portion on the opening side of the first case 58. Thus, the servo pressure generating chamber 57 is formed by the space that is surrounded by the internal surface of the first case 58, the external surface, internal surface and bottom surface of the body portion 51a of the first piston 51, the external surface of the second cylindrical portion 56a2 of the valve housing 56a and the front end surface of the collar portion 56a3. Thus, the servo pressure chamber 57 communicates with the first space 45.

Between the bottom surface of the body portion 51a and the front end surface of the collar 56a3 in the servo pressure generating chamber 57, a spring 47 is provided through a spacer arranged on the bottom side of the body portion 51a, with itself compressed. The spring 47 urges the first piston 51 toward the second piston 52 side.

Further, O-rings 96-102 made of, for example, rubber are provided on the external surface of the sub assembly 80 to fluid-tightly seal the fitting portions between the sub assembly 80 and the small diameter portion 55i and the medium diameter portion 55*j* of the housing 55 in the state the sub assembly 80 constructed like this is inserted and arranged in the housing 55. Specifically, the O-rings 96-102 are provided on both sides in the axial direction of each of the communication passages 55*c*1, 55*d*1-55*h*1 in order to fluid-tightly connect the port 56*a*6 provided in the second case 59 and the ports 58*d* to 58*h* provided in the first case 58 with the ports 55*c* to 55*h* which are provided in the housing 55 in correspondence with those ports in the second and first cases 59, 58.

(Brake Fluid Absorbing Section)

Figure 3:
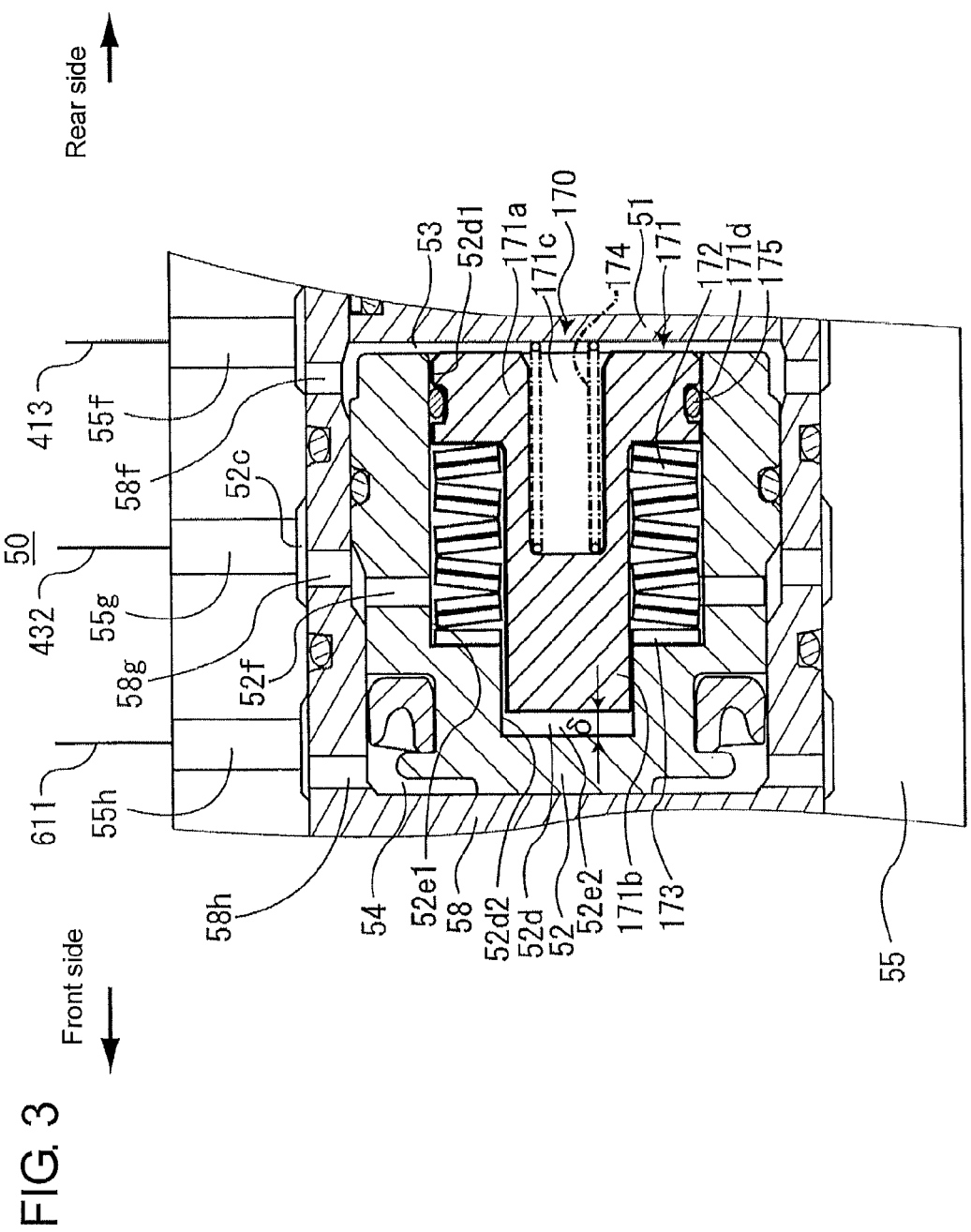
FIG. 3 is a fragmentary sectional view showing a part of FIG. 2, that is, a brake fluid absorbing section in an enlarged scale.

Next, the brake fluid absorbing section 170 will be described with reference to FIG. 3. The brake fluid absorbing section 170 communicates with the first pilot chamber 53 and absorbs the brake fluid of the quantity depending on the fluid pressure in the first pilot chamber 53. As shown in FIG. 3, the brake fluid absorbing section 170 is composed of a piston receiving portion 52*d* formed in the second piston 52, a pressure receiving piston 171, washer springs 172 (urging member), a shim 173, a coil spring 174 (second urging member) and a seal member 175.

The piston receiving portion 52*d* is formed on the rear end side of the second piston 52 to open to the first pilot chamber 53. The piston receiving portion 52*d* is composed of a first piston receiving portion 52*d*1 on the rear side (first pilot chamber 53 side) and a second piston receiving portion 52*d*2 on the front side communicating with a front part of the first piston receiving portion 52*d*1. The first piston receiving portion 52*d*1 is a columnar shape space being circular in section. The second piston receiving portion 52*d*2 is a columnar shape space being circular in section and being smaller in diameter than the first piston receiving portion 52*d*1. The second piston 52 is formed with a fluid passage 52*f* communicating with the first piston receiving portion 52*d*1 and connected to the intermediate atmospheric pressure chamber 52*c* (ports 58*g*).

The pressure receiving piston 171 has a large diameter portion 171*a* of a columnar shape formed on the rear side and being circular in cross-section and a small diameter portion 171*b* of a columnar shape protruding from the front end of the large diameter portion 171*a* and being circular in cross-section and smaller in diameter than the outside diameter of the large diameter portion 171*a*. A spring receiving portion 171*c* being a columnar shape space is formed at the rear end portion of the large diameter portion 171*a*. A seal member fitting groove 171*d* is formed on the external surface of the large diameter 171*a* over the whole circumference. The pressure receiving piston 171 is received in the piston receiving portion 52*d* slidably in the axial direction with the large diameter portion 171*a* thereof received in the first piston receiving portion 52*d*1 and with the small diameter portion 171*b* thereof received in the first piston receiving portion 52*d*1 and the second piston receiving portion 52*d*2.

In the space between the small diameter portion 171*b* of the pressure receiving piston 171 and the first piston receiving portion 52*d*1, the plurality of washer springs 172 and the shim 173 being a ring plate shape are arranged in the axial direction, and thus, the pressure receiving piston 171 is urged rearward (toward the first pilot chamber 53 side) by the plurality of the washer springs 172. Further, the spring receiving portion 171*c* of the pressure receiving piston 171 receives the coil spring 174 being in contact with the front end surface of the first piston 51, and the pressure receiving piston 171 is urged forward by the coiling spring 174. In the present embodiment, since the washer springs 172 are utilized as the urging member urging the pressure receiving piston 171 rearward, the washer springs 172 do not have a change in the spring constant due to the variation of the temperature and thus, can urge the pressure receiving piston 171 stably in comparison with the case of using the rubber as the urging member.

The spring constant of the plurality of washer springs 172 is set to be larger than that of the coil spring 174. As the pressure receiving piston 171 is urged forward by the coil spring 174, the plurality of washer springs 172 are precompressed, and the pressure receiving piston 171 is positioned relative to the second piston 52. In this state, the bottom part of the second piston receiving portion 52*d*2 and the front end of the small diameter portion 171*b* are separated by a predetermined length 6. The shim 173 adjusts the difference in thickness between the plurality of washer spring 172 manufactured and those in design and arranges the pressure receiving piston 171 at a position, determined in design, in the piston receiving portion 52*d*.

The seal member 175 being, for example, a rubber O-ring is attached in the seal member fitting groove 171*d* and seals the fitting portion between the external surface of the large diameter portion 171*a* of the pressure receiving piston 171 and the internal surface of the first piston receiving portion 52*d*1. Brake fluid is filled in the space (hereinafter referred to as brake fluid chamber 52*e*1) receiving the washer spring 172 between the small-diameter portion 171*b* of the pressure receiving piston 171 and the first piston receiving portion 52*d*1 as well as in the space (hereinafter referred to as brake fluid chamber 52*e*2) between the bottom portion of the second piston receiving portion 52*d*2 and the front end of the small diameter portion 171*b*. In other words, the brake fluid chambers 52*e*1, 52*e*2 are formed in the piston receiving portion 52*d* on the opposite side to the first pilot chamber 53, are partitioned by the piston receiving portion 52*d* and the pressure receiving piston 171, and are varied in the capacities by the sliding of the pressure receiving piston 171. Since the brake fluid chamber 52*e*1 is filled with the brake fluid, the washer spring 172 and the shim 173 are prevented from being corroded.

The brake fluid chambers 52*e*1, 52*e*2 communicate with each other. The brake fluid chambers 52*e*1, 52*e*2 communicate with the reservoir 43 through the fluid passage 52*f*, the ports 58*g* and the pipes 432, 431. Accordingly, the movement of the pressure receiving piston 171 toward the rear side causes the brake fluid to flow from the reservoir 43 side into the brake fluid chambers 52*e*1, 52*e*2, while the movement of the pressure receiving piston 171 toward the front side causes the brake fluid in the brake fluid chambers 52*e*1, 52*e*2 to be discharged toward the reservoir 43 side.

With this construction, the capacity of the first pilot chamber 53 is variable with the sliding of the pressure receiving piston 171. That is, as the fluid pressure in the first pilot chamber 53 increases, the pressure receiving piston 171 is moved forward to increase the capacity of the first pilot chamber 53.

(Brake Piping)

Next, the brake piping will be described briefly. The ports 10*m* and 10*n* of the first and second master chambers 10*f*, 10*g* that generate the master pressure Pm are connected to the well-known ABS (antilock brake system) 60 through the pipes 61, 62 and opening/closing valves 61*a*, 62*a*, respectively. The ABS 60 is connected to the wheel cylinders WCfl, WCfr, WCrl, WCrr that operate the friction brakes for applying brake forces to the wheels Wfl, Wfr, Wrl, Wrr.

With respect to the ABS 60, the construction for one (e.g., right-side front wheel Wfr) of the four wheels will be described typically. The ABS 60 is provided with a retention valve 60*a*, a reducing valve 60*b*, a reservoir 60*c*, a pump 60*d* and a motor 60*e*. The retention valve 60*a* is an electromagnetic valve of the normally open type and is controllable by the brake ECU 2 to be opened or closed. The retention valve 60a is connected to the pipe 62 on one side and to the wheel cylinder WCfr and the reducing valve 60b on the other side. That is, the retention valve 60a operates as input valve in the ABS 60 for the wheel Wfr. Because the ABS is well-known in the art, the operation thereof will be omitted from detail description.

(Brake ECU)

The brake ECU 2 is an electronic control unit and has a micro computer. The micro computer is provided with an input/output interface, a CPU, a RAM and a storage section such as ROM, nonvolatile memory or the like which are connected with one another through a bus (all not shown). The brake ECU 2 executes programs corresponding to a linear mode and a REG mode referred to later. The RAM temporarily stores variables necessary for executing the programs. The storage section stores the programs, data maps and the like.

The brake ECU 2 communicates with the respective sensors 15, 73-75 and controls the respective electromagnetic valves 41, 42, 60a, 60b, the motors 33, 60e and the like. In FIG. 1, the connection of the brake ECU 2 with the stroke sensor 15 is typically illustrated by a broken line, while the connections of the brake ECU 2 with the various other sensors 73-75, the respective electromagnetic valves 41, 42, 60a, 60b and the motors 33, 60e are omitted from illustration for simplicity.

Further, the brake ECU 2 and the hybrid ECU (not shown) are connected to be able to communicate with each other and perform a corporative control (corporative regeneration control) so that a demand brake force becomes equal to the sum of a target regenerative brake force generated by the regenerative brake device and a target friction brake force generated by the friction brake device B. The brake ECU 2 stores two control modes including the linear mode and the REG mode.

(Linear Mode)

First of all, an ordinary operation in the linear mode will be described. The linear mode is an ordinary brake control, in which the brake ECU 2 controls the reducing valve 41 and the pressure increase valve 42 to control the servo pressure Ps in the servo pressure chamber 10e. Specifically, in the linear mode, the brake ECU 2 calculates a demand brake force by the driver from the manipulation amount of the brake pedal 4 (manipulation amount of the input piston 12) detected by the stroke sensor 15. Then, the brake ECU 2 outputs the driver's demand brake force to the hybrid ECU and obtains a target value for (i.e., to be undertaken by) the regenerative brake device, that is, a target regenerative brake force from the hybrid ECU and then calculates a target friction brake force by subtracting the target regenerative brake force from the demand brake force. Thereafter, the brake ECU 2 controls the reducing valve 41 and the pressure increase valve 42 of the pilot pressure generating device 40 based on the calculated target friction brake force to generate the pilot pressure Pa of a predetermined pressure. Thus, a servo pressure Ps (=pilot pressure Pa) is generated by the regulator 50 and is supplied to the servo pressure chamber 10e, whereby the friction brake force by the friction brake device B is controlled to become the target friction brake force.

Therefore, when the brake pedal 4 is stepped on, the brake ECU 2 controls the reducing valve 41 in the closing direction and the pressure increase valve 42 in the opening direction based on the target friction brake force to control the pilot pressure Pa in the first pilot chamber 53 to the target pilot pressure. That is, the closing of the reducing valve 41 causes the first pilot chamber 53 to be blocked from the reservoir 43, and the opening of the pressure increase valve 42 causes the first pilot chamber 53 to communicate with the accumulator 31. Thus, the pilot pressure Pa in the first pilot chamber 53 can be increased by the brake fluid of a high pressure supplied from the accumulator 31. With an increase in the pilot pressure Pa, the first piston 51 (control piston 51b) is urged toward the valve mechanism 56 to move the control piston 51b toward the bottom side of the housing body 55a. As a result, the end of the protruding portion 51b2 of the control piston 51b is brought into contact with the ball valve 56b2, whereby the passage 51b3 in the protruding portion 51b2 is closed by the ball valve 56b2 to block the communication of the first space 45 with the reservoir 43.

When the control piston 51b is further moved toward the bottom side of the housing body 55a, the protruding portion 51b2 presses the ball valve 56b2 toward the bottom side of the housing body 55a to separate the ball valve 56b2 from the valve seat 56c2 against the urging force of the coil spring 56d. Thus, the first and second spaces 45, 46 communicate with each other through the through hole 56c3 of the valve seat member 56c1. Since the brake fluid of the high pressure has been supplied from the accumulator 31 to the second space 46, the pressure in the first space 45 is increased by the communication.

As a result of the increase in fluid pressure of the first space 45, the force acting on the first piston 51 in the first space 45 becomes larger than the force generated by the pilot pressure Pa acting on the first piston 51, and thus, the first piston 51 is slidden toward the front side to block the first space 45 from the second space 46. Through these operations, the fluid pressure in the first space 45 becomes the fluid pressure depending on the pilot pressure Pa.

Further, the brake ECU 2 controls the pressure increase valve 42 in the opening direction and controls the reducing valve 41 in the closing direction so that the larger the target friction brake force becomes, the higher the pilot pressure Pa in the first pilot chamber 53 becomes. That is, with the rise in the target friction brake force, the pilot pressure Pa is raised and the servo pressure Ps is also raised.

With the pressure increase in the first space 45 and the servo pressure generating chamber 57, the servo pressure Ps in the servo pressure chamber 10e communicating therewith is increased. With the pressure increase in the servo pressure chamber 10e, the first master piston 11a is advanced forward to raise the master pressure Pm in the first master chamber 10f. Thus, the second master piston 11b is advanced forward to raise the master pressure Pm in the second master chamber 10g. At this time, the master pressure Pm in the second master chambers 10g becomes equal to that in the first master chamber 10f.

Then, in the present embodiment, as mentioned earlier, the servo pressure Ps in the servo pressure chamber 10e is controlled to become equal to the pilot pressure Pa. Further, the master pressure Pm is also controlled to become equal to the pilot pressure Pa (that is, control is performed to make the relation of servo pressure Ps=master pressure Pm=pilot pressure Pa).

Further, with the pressure increase in the first master chamber 10f and the second master chamber 10g, the high pressure brake fluids are supplied from the first master chamber 10f and the second master chamber 10g to the wheel cylinders WCrl, WCrr, WCfl, WCfr, whereby the friction brakes are operated to brake the vehicle. At this time, the brake fluid at the servo pressure Ps (=pilot pressure Pa) is also supplied from the first master chamber 10f to the second pilot chamber 54. In the present embodiment, because the area B of the end surface 52*b*1 at which the second piston 52 receives the pilot pressure Pa in the first pilot chamber 53 is formed to be larger than the area A of the end surface 52*a*1 at which it receives the pressure in the second pilot chamber 54, the second piston 52 is urged usually toward the second pilot chamber 54 side and hence, is not moved.

When the braking manipulation is released, on the contrary, the reducing valve 41 is brought into the open state and the pressure increase valve 42 is brought into the closed state to make the first pilot chamber 53 communicate with the reservoir 43. Thus, the fluid pressure in the first pilot chamber 53 is controlled to be reduced to the atmospheric pressure linearly as targeted. Consequently, the control piston 51*b* is urging by the spring 47 to be retracted toward the front side, and the brake pedal 4 is returned to the state before being stepped on.

(REG Mode)

Next, the REG mode will be described briefly. The REG mode is a mode wherein the reducing valve 41 and the pressure increase valve 42 are made to a deenergized state or become the deenergized state (holding of the ordinary state) due to a fault or malfunction. In the REG mode, the reducing valve 41 and the pressure increase valve 42 are not electrified (not controlled), so that the reducing valve 41 remains in the open state and the pressure increase valve 42 remains in the closed state. Further, the non-electrified state (out-of-control state) is kept even after the brake pedal 4 is stepped on.

In the REG mode, when the brake pedal 4 is stepped on, the input piston 12 is advanced, and the front end surface of the input piston 12 is contacted shortly with the rear end surface of the first master piston 11*a* to advance the first master piston 11*a*. At this time, the servo pressure is not controlled because the reducing valve 41 and the pressure increase valve 42 have not been electrified. That is, the first master piston 11*a* is advanced by only the force corresponding to the manipulation force applied on the brake pedal 4.

When the first master piston 11*a* is advanced, the pressure in the first and second master chambers 10*f*, 10*g* are increased as is the case of the linear mode. Further, with the pressure increase in the first master chamber 10*f*, the pressure in the second pilot chamber 54 is also increased. With the pressure increase in the second pilot chamber 54, the second piston 52 is slidden toward the bottom side of the housing body 55*a* as it presses the first piston 51. At the same time, the protruding portion 51*b*2 of the control piston 51*b* is slidden toward the bottom side of the housing body 55*a*. As a result, the protruding portion 51*b*2 comes to contact with the ball valve 56*b*2 and closes the inlet port of the passage 51*b*3 passing through the protruding portion 51*b*2 to block the communication of the first space 45 (i.e., the servo pressure generating chamber 57) with the reservoir 43. Further, the protruding portion 51*b*2 presses the ball valve 56*b*2 to move the same toward the bottom side of the housing body 55*a*. Thus, the first space 45 and the second space 46 are brought into communication, whereby the high pressure brake fluid from the accumulator 31 is supplied to the servo pressure chamber 10*e* through the servo pressure generating chamber 57.

In this way, in the REG mode, when the brake pedal 4 is stepped on through the predetermined stroke by the manipulation force, the servo pressure chamber 10*e* is brought into communication with the accumulator 31 and thus, can have the servo pressure therein increased without control on the valves 41, 42. Therefore, it is possible to advance the first master piston 11*a* by the force that is higher than the driver's manipulation force. As a result, the high pressure brake fluid is supplied to the ABS 60 even with the respective electromagnetic valves remaining in the non-electrified state.

As described earlier, the second piston 52 is provided with the stepped portion on the external surface, and the small and large diameter columnar portions 52*a*, 52*b* are provided thereon with the seal members 81, 82 for fluid-tightly sealing the fitting portions between the small and large diameter columnar portions 52*a*, 52*b* and the mating potions on the internal surface of the first case 58. Further, the intermediate atmospheric pressure chamber 52*c* communicating with the reservoir 43 is provided between the seal members 81, 82 in the axial direction.

Thus, during the operation of the friction brake device B, even if the sealing function of the seal member 81 deteriorates for example, the properly working sealing function of the seal member 82 sealing the large diameter columnar portion 52*b* ensures that the pilot pressure Pa of the predetermined pressure can be generated in the first pilot chamber 53. For this reason, the ordinary servo pressure Ps can be supplied to the servo pressure chamber 10*e*, and the predetermined master pressure Pa can be generated in the second master chamber 10*g*. As a result, although the total brake force decreases, it is possible to secure a sufficient brake force and thus, to guarantee the safety. At this time, since the second pilot chamber 54 comes to the communication with the reservoir 43 due to the leak of the brake fluid through the seal member 81, it becomes difficult to make the predetermined master pressure Pm generate in the first master chamber 10*f*. Therefore, the deterioration in function of the seal member 81 can be detected through the observation of the pressure in the first master chamber 10*f*, so that an early action can be taken against the deficiency or the leak.

(Comparison of Vehicle Brake Device in Present Embodiment with that in Prior Art and Effects in Present Embodiment)

Hereinafter, with reference to FIGS. 5(A) to 5(C), description will be made regarding the comparison of the vehicle brake device in the present embodiment with that in the prior art. FIG. 5(A) is a graph showing the relation between the pilot pressure and the time elapsed in the vehicle brake device in the prior art. FIG. 5(B) is a graph showing the relation between the pilot pressure and the time elapsed when the brake pedal 4 is stepped on slowly (gentle stepping) in the present embodiment. FIG. 5(C) is a graph showing the relation between the pilot pressure and the time elapsed when the brake pedal 4 is stepped on quickly (urgent braking) in the present embodiment.

In the prior art vehicle brake device, the fluid quantity of the brake fluid that passes through the pressure increase valve 42 being an electromagnetic valve is extremely small because the brake fluid is an incompressible fluid and because the first piston 51 and the first pilot chamber 53 are small respectively in sliding amount and capacity variation. Thus, when the pressure increase valve 42 is opened, the brake fluid flows from the accumulator 31 to the first pilot chamber 53 as indicated at (1) in FIG. 5(A), whereby the pilot pressure Pa is raised abruptly beyond the target pilot pressure (i.e., the occurrence of overshooting). This causes the pressure sensor 74 to detect an excessive servo pressure Ps, and the brake ECU 2 thus controls the pilot pressure Pa to be lowered, whereby the pilot pressure Pa is decreased to become lower than the target pilot pressure, as indicated at (2) in FIG. 5(A). Then, a too-low servo pressure Ps is detected by the pressure sensor 74, and the brake ECU 2 thus controls the pilot pressure Pa to rise, whereby the pilot pressure Pa is increased abruptly again beyond the target pilot pressure, as indicated at (3) in FIG. 5(A). As mentioned above, in the prior art vehicle brake device, it is difficult to control the pilot pressure Pa to the target pilot pressure, in other words, it is difficult to accurately control the pilot pressure Pa. As a result, it becomes difficult to accurately control the servo pressure Ps and the master pressure Pm.

On the other hand, in the present embodiment, the brake fluid absorbing section 170 is provided which communicates with the first pilot chamber 53 for absorbing the brake fluid depending on the fluid pressure in the first pilot chamber 53. Thus, when the fluid pressure in the first pilot chamber 53 is heightened through the opening of the pressure increase valve 42 being an electromagnetic valve, the pressure receiving piston 171 is slidden forward to increase the capacity of the first pilot chamber 53. Then, the brake fluid flows from the pressure increase valve 42 side to the first pilot chamber 53, so that the brake fluid in a quantity sufficient to control the pressure flows through the pressure increase valve 42. In this way, since the brake fluid in a quantity that is sufficient to control the pressure can pass through the pressure increase valve 42 in controlling the pilot pressure Pa to the target pilot pressure, it becomes possible to control the pilot pressure Pa accurately to the target pilot pressure, as shown in FIG. 5(B). Therefore, it is possible to control the servo pressure Ps and the master pressure Pm accurately and hence, to generate a desired friction brake force.

The urging force by which the washer springs 172 urge the pressure receiving piston 171 toward the first pilot chamber 53 side is set to have the following relation with the force by which the fluid pressure in the first pilot chamber 53 moves the pressure receiving piston 171 forward. (Here, the urging force by the coil spring 174 is ignored because of being extremely small.) That is, the higher the pressure in the first pilot chamber 53 becomes, the larger the sliding amount forward of the pressure receiving piston 171 becomes to increase the capacity in the first pilot chamber 50, so that the brake fluid absorbing section 170 absorbs the brake fluid depending on the fluid pressure in the first pilot chamber 53. Thus, even when because of a target pilot pressure being low, the pressure increase valve 42 opens to apply a low pressure brake fluid to the first pilot chamber 53, the pressure receiving piston 171 is moved forward by a moving amount depending on the fluid pressure in the first pilot chamber 53, so that the fluid pressure reliably acts on the first pilot chamber 53.

FIG. 5(C) is a graph showing the relation of the pilot pressure with the time elapsed when the brake pedal 4 is stepped on quickly at the time of an urgent braking. When the quick stepping of the brake pedal 4 causes the target friction brake force to increase abruptly, the pressure increase valve 42 is abruptly opened to generate the target friction brake force, whereby the fluid pressure in the first pilot chamber 53 is increased abruptly. At this time, while the pressure receiving piston 171 would otherwise be slidden forward, the orifice 179 is provided on the pipe 432 (shown in FIG. 1) as mentioned above, and thus, the orifice 179 restricts the flow quantity of the brake fluid discharged from the brake fluid chambers 52e1, 52e2 to impede the sliding of the pressure receiving piston 171. Thus, an increase in capacity of the first pilot chamber 53 is suppressed to restrict the quantity of the brake fluid absorbed from the first pilot chamber 53 to the brake fluid absorbing section 170, and thus, as shown in FIG. 5(C), the pilot pressure Pa is increased immediately or in an instant to reach the target pilot pressure.

As mentioned above, the front end of the small diameter portion 171b is separated from the bottom portion of the second piston receiving portion 52d2 by the predetermined dimension 6, as indicated in FIG. 3. Thus, the forward sliding of the pressure receiving piston 171 is limited to the predetermined dimension 6, so that the washer springs 172 can be prevented from being broken by the excessive forward movement of the pressure receiving piston 171. Further, even when the forward movement of the pressure receiving piston 171 is restricted to the predetermined dimension 6, the pressure increase valve 42 can pass through the brake fluid of a quantity sufficient to control the pressure.

Effects in Embodiment

As clear from the foregoing description, the brake fluid absorbing section 170 absorbs the brake fluid depending on the fluid pressure in the first pilot chamber 53. Thus, when the pressure increase valve 42 (electromagnetic valve) is opened to increase the fluid pressure in the first pilot chamber 53, the brake fluid is absorbed by the brake fluid absorbing section 170 to allow the brake fluid to pass through the pressure increase valve 42. Therefore, because the flow quantity of the brake fluid that is sufficient for the pressure increase valve 42 to control the pilot pressure Pa can be secured at the time of the generation of the pilot pressure Pa, it is possible to accurately control the pilot pressure Pa that is used in generating the servo pressure Ps by the pressure increase valve 42.

As shown in FIG. 3, the brake fluid absorbing section 170 is composed of the piston receiving portion 52d communicating with the first pilot chamber 53, the pressure receiving piston 171 slidably received in the piston receiving portion 52d and the washer springs 172 (urging member) that urge the pressure receiving piston 171 toward the first pilot chamber 53 side. Thus, it is possible to downsize the brake fluid absorbing section 170 in comparison with a construction using a displacement type damper that is not provided with the pressure receiving piston 171 and the urging member 172.

Further, as shown in FIG. 3, the pressure receiving piston 171 is slidably received in the piston receiving portion 52d formed in the second piston 52. Since the brake fluid absorbing section 170 is provided in the second piston 52, it is unnecessary to provide the brake fluid absorbing section 170 outside the regulator 50, so that the friction brake device B (vehicle control device) can be prevented from being enlarged in scale.

Further, as shown in FIG. 1, the orifice 179 (flow quantity restricting portion) restricts the flow quantity of the brake fluid discharged from the brake fluid chambers 52e1, 52e2 (piston receiving portion 52d) (shown in FIG. 3). Thus, when the quick stepping of the brake pedal 4 causes the pressure increase valve 42 (electric magnetic valve) to be opened abruptly and hence, to raise the fluid pressure in the first pilot chamber 53 abruptly, the orifice 179 restricts the flow quantity of the brake fluid discharged from the brake fluid chambers 52e1, 52e2. As a result, the forward sliding of the pressure receiving piston 171 is impeded to suppress the increase in capacity of the first pilot chamber 53. For this reason, as shown in FIG. 5(C), the pilot pressure Pa is heightened immediately or in an instant, whereby a sufficient friction brake force can be generated at the time of an urgent braking. On the other hand, since when the brake pedal 4 is stepped on slowly, the restriction by the orifice 179 on the flow quantity of the brake fluid discharged from the brake fluid chambers 52e1, 52e2 is smaller than that at the time of the quick stepping, the sliding of the pressure receiving piston 171 is hardly impeded. Therefore, the brake fluid of the quantity depending on the fluid pressure in the first pilot chamber 53 is absorbed by the brake fluid absorbing section 170, so that it is possible to control the pilot pressure Pa accurately by the pressure increase valve 42.

Further, as shown in FIG. 3, the coil spring 174 (second urging member) precompresses the washer springs 172 (urging member). Thus, it is possible to hold the pressure receiving piston 171 always in contact with the washer springs 172 and to hold the washer springs 172 always in contact with the shim 173. Thus, the pressure receiving piston 171 is positioned relative to the second piston 52 in this state. Therefore, even when the fluid pressure is heightened in the first pilot chamber 53, it does not occur that the pressure receiving piston 171 comes into collision with the washer springs 172. This makes it possible to prevent a crashing sound from being generated due to the collision of the pressure receiving piston 171 with the washer springs 172. Further, it is possible to prevent the washer springs 172 from being damaged due to the collision of the pressure receiving piston 171 with the washer springs 172.

In the foregoing embodiment, the urging member that urges the pressure receiving piston 171 toward the first pilot chamber 53 side comprises the plurality of the washer springs 172. However, the urging member is not limited to the plurality of washer springs 172 and can take the form of a spring such as coil spring, rubber or the like. Further, the second urging member that precompresses the urging member is not limited to the coil spring 174 and can take the form of single or plurality of washer springs, rubber or the like.

In the foregoing embodiment, the brake fluid absorbing section 170 that communicates with the first pilot chamber 53 for absorbing the brake fluid of the quantity depending on the fluid pressure in the first pilot chamber 53 is composed of the piston receiving portion 52d formed in the second piston 52, the pressure receiving piston 171, the washer springs 172, the shim 173 and the coil spring 174. However, there can be taken a modified embodiment wherein a brake fluid absorbing section is constructed by forming the rear end of the second piston 52 with a concave portion for a diaphragm opening to the first pilot chamber 53 and providing the diaphragm to close the concave portion. Even in this modified embodiment, the diaphragm yields in dependence on the fluid pressure in the first pilot chamber 53, and the first pilot chamber 53 is varied in capacity. When the fluid pressure in the first pilot chamber 53 is raised, the diaphragm yields to absorb the brake fluid in the first pilot chamber 53 toward the concave portion side for the diaphragm, whereby the brake fluid is allowed to pass through the pressure increase valve 42. Accordingly, as mentioned earlier, it is possible to control the pilot pressure Pa accurately by the pressure increase valve 42.

Further Modifications in First Embodiment

In the foregoing embodiment, the second piston 52 is provided therein with the brake fluid absorbing section 170 that communicates with the first pilot chamber 53 for absorbing the brake fluid of the quantity depending on the fluid pressure in the first pilot chamber 53. However, a brake fluid absorbing section that communicates with the first pilot chamber 53 for absorbing the brake fluid of the quantity depending on the fluid pressure in the first pilot chamber 53 can be provided in the first piston 51 in place of being provided in the second piston 52.

In the foregoing embodiment, the orifice 179 is provided on the pipe 432. However, in place of being provided on the pipe 432 or in addition to being provided thereon, the orifice 179 can be provided on each of the port 55g, the ports 58g, and the fluid passage 52f. Alternatively, the section areas of the port 55g, the ports 58g, and the fluid passage 52f can be diminished to restrain the brake fluid from passing therethrough.

Further, in the foregoing embodiment, the brake fluid chambers 52e1, 52e2 are filled with the brake fluid and are in communication with the reservoir 43. However, there can be taken a modified embodiment wherein the brake fluid chambers 52e1, 52e2 (referred to as air chambers in the description hereinafter) are filled with the atmospheric air and are opened to the atmosphere through the pipe 432 and the orifice 179. Even in this modified embodiment, when the quick stepping of the brake pedal 4 causes the pressure increase valve 42 (electromagnetic valve) to be opened abruptly and hence, to abruptly raise the fluid pressure in the first pilot chamber 53, the orifice 179 restricts the quantity of the air discharged from the air chambers. As a result, the forward sliding of the pressure receiving piston 171 is impeded to suppress the increase in capacity of the first pilot chamber 53. As a result, the pilot pressure Pa can be heightened immediately or in an instant, so that it is possible to generate a sufficient friction brake force at the time of an urgent braking.

Further, there can be taken a further modified embodiment wherein the second piston 52 is provided therein with a partition wall dividing the piston receiving portion 52d from the first pilot chamber 53 and wherein the partition wall is provided with a flow passage having a flow quantity restricting portion (i.e., a flow passage making the first pilot chamber 53 communicate with an area of the piston receiving portion 52d which area is on the first pilot chamber 53 side beyond the pressure receiving piston 171).

(Vehicle Brake Device in Second Embodiment)

Hereinafter, with reference to FIG. 6, a vehicle brake device in a second embodiment will be described with the focus placed on the difference from that in the first embodiment. In the second embodiment, in place of providing the brake fluid absorbing section 170 in the second piston 52, a brake fluid absorbing section 270 is provided outside the regulator 50. In the housing 55, a port 55m communicating with the first pilot chamber 53 is formed at a position different from the position where the communication passage 55f1 is connected to the pipe 413 through the port 55f.

Like the brake fluid absorbing section 170 in the foregoing first embodiment, the brake fluid absorbing section 270 communicates with the first pilot chamber 53 for absorbing the brake fluid of the quantity depending on the fluid pressure in the first pilot chamber 53. The brake fluid absorbing section 270 is composed of a cylinder 271, a pressure receiving piston 272, and a spring 273 (urging member). The cylinder 271 (piston receiving portion) takes a cylindrical shape closed at opposite ends and is formed with a port 271a on one end side. The piston 272 of a columnar shape is arranged in the cylinder 271 slidably in the axial direction. The piston 272 is urged by the spring 273 toward the side on which the port 271a is formed. The space receiving the spring 273 is in communication with the outside for allowing the movement of the pressure receiving piston 272.

The port 271a and the port 55m are connected through a pipe 501. On the pipe 501, there is provided a flow quantity restricting portion such as an orifice 279 or the like that is smaller in fluid passage than other portions to restrict the flow quantity. A brake fluid chamber 271b is formed in a space between the pressure receiving piston 272 and the interior of the cylinder 271 on the side where the port 271a is formed. The brake fluid chamber 271b communicates with the first pilot chamber 53 through the port 271a, the pipe 501, the port 55m, the communication passage 55f1 and the port 55f.

With this construction, when the fluid pressure in the first pilot chamber 53 is heightened, the pressure receiving piston 272 is slidden against the urging force of the spring 273 toward the opposite side to the port 271a to increase the capacity of the brake fluid chamber 271b, and thus, the brake fluid in the first pilot chamber 53 is absorbed to the brake fluid chamber 271b. Thus, since in the same manner as in the first embodiment, the brake fluid of a flow quantity that is sufficient for the pressure increase valve 42 to control the pilot pressure Pa can be secured at the time of generating the pilot pressure Pa, it is possible to accurately control the pilot pressure Pa that enables the pressure increase valve 42 to control the servo pressure Ps.

Further, the orifice 279 (flow quantity restricting portion) that restricts the flow quantity of the brake fluid is provided on the pipe 501 (flow passage) between the first pilot chamber 53 and the cylinder 271 (piston receiving portion) communicating with the first pilot chamber 53. Thus, when a quick braking manipulation causes the pressure increase valve 42 (electromagnetic valve) to be opened abruptly and hence, to raise the fluid pressure in the first pilot chamber 53 abruptly, the orifice 279 restricts the flow quantity of the brake fluid flowing into the brake fluid chamber 271b of the cylinder 271. As a result, the sliding of the pressure receiving piston 272 is impeded to suppress the increase in capacity of the first pilot chamber 53. Thus, the pilot pressure Pa is heightened immediately or in an instant, so that it is possible to generate a sufficient friction brake force at the time of an urgent braking. On the other hand, when the brake manipulation is done slowly, the restriction by the orifice 279 on the flow quantity of the brake fluid flowing into the brake fluid chamber 271b is small in comparison with that at the time of the quick braking manipulation, and the sliding of the receiving piston 272 is hardly impeded. Consequently, the brake fluid in the first pilot chamber 53 is absorbed by the brake fluid chamber 271b in a quantity depending on the fluid pressure in the first pilot chamber 53, so that it is possible to control the pilot pressure Pa accurately by the pressure increase valve 42.

In place of providing the aforementioned flow quantity restricting portion on the pipe 501, there can be taken a modified embodiment wherein the cylinder 271 is provided in the outer wall thereof with a passage connecting the outside of the cylinder 271 with a space (the space receiving the spring 273) in the cylinder 271 which space is located on the opposite side to the brake fluid chamber 271b with the pressure receiving piston 272 therebetween, and wherein a flow quantity restricting portion is provided for restricting the flow quantity of fluid (including oil, air or the like) passing through the passage.

Other Embodiments

In the foregoing embodiments, the brake ECU 2 calculates the demand brake force on the basis of the moving amount (manipulation amount) of the input piston 12 and then calculates the target friction brake force. However, there can be taken a modified embodiment wherein the brake ECU 2 detects not only the moving amount of the input piston 12 but also the reaction force pressure in the reaction force generating device 20, calculates the demand brake force with the reaction force pressure also taken into consideration and then calculates the target friction brake force.

Further, in the foregoing embodiments, the stroke sensor 15 for detecting the moving amount of the input piston 12 is the sensor arranged in the vicinity of the brake pedal 4 for detecting the stroke amount of the brake pedal 4. However, the stroke sensor 15 can be a sensor arranged in the vicinity of the input piston 12 for directly detecting the moving amount (stroke amount or manipulation amount) of the input piston 12.

Moreover, in the foregoing embodiments, the brake pedal 4 is used as a member that transmits the driver's manipulation force to the input piston 12. However, the member that transmits the driver's manipulation force is not limited to the brake pedal 4 and can be, for example, a brake lever or a brake handle. Further, needless to say, even where the vehicle brake device (friction brake device B) in the present embodiments is applied to a motorbike or other vehicles, the technical concept of the present invention is applicable thereto.

Finally, various features and many of the attendant advantages in the foregoing embodiments will be summarized as follows:

In each of the foregoing first and second embodiments typically shown in FIGS. 1, 3 and 6, the brake fluid absorbing section 170, 270 is provided that communicates with the first pilot chamber 53 and that absorbs the brake fluid of the quantity depending on the fluid pressure in the first pilot chamber 53. The brake fluid absorbing section 170, 270 absorbs the brake fluid of the quantity depending on the fluid pressure in the first pilot chamber 53, and when the electromagnetic valve 42 is opened to raise the fluid pressure in the first pilot chamber 53, brake fluid is absorbed by the brake fluid absorbing section 170, 270, and thus, brake fluid flows through the electromagnetic valve 42. Therefore, the flow of brake fluid of a quantity that is sufficient for the electromagnetic valve 42 to control the pilot pressure Pa is secured at the time of generating the pilot pressure Pa, so that it is possible to accurately control the pilot pressure Pa that is used in generating the servo pressure Ps by the electromagnetic valve 42.

Also in the foregoing first and second embodiments typically shown in FIGS. 1, 3 and 6, the brake fluid absorbing section 170, 270 comprises the piston receiving portion 52d, 271 communicating with the first pilot chamber 53, the pressure receiving piston 171, 272 slidably received in the piston receiving portion 52d, 271, and the urging member 172, 273 that urges the pressure receiving piston 171, 272 toward the first pilot chamber 53 side. Thus, the brake fluid absorbing section 170, 270 can be downsized in comparison with a construction that uses a displacement type damper without having a pressure receiving piston and an urging member.

In the foregoing first embodiment typically shown in FIGS. 1 and 3, the pressure receiving piston 171 is slidably received in the piston receiving portion 52d formed in the second piston 52. Because like this, the second piston 52 is provided therein with the brake fluid absorbing section 170, the vehicle brake device can be prevented from becoming large in dimension.

In the foregoing first embodiment typically shown in FIGS. 1 and 3, the flow quantity restricting portion 179 restricts the flow quantity of the fluid discharged from the piston receiving portion 52d on the side opposite to the first pilot chamber 53. Thus, when the quick braking manipulation causes the electromagnetic valve 42 to open abruptly to raise the fluid pressure abruptly in the first pilot chamber 53, the flow quantity of the fluid discharged from the piston receiving portion 52d is restricted by the flow quantity restricting portion 179. As a result, the sliding of the pressure receiving piston 171 is impeded to suppress the increase of the first pilot chamber 53 in capacity. Therefore, the pilot pressure Pa is increased immediately or in an instant, so that it is possible to generate a sufficient friction brake force at the time of an urgent braking. On the other hand, since when the braking manipulation is done gently, the restriction by the flow quantity restricting portion 179 on the flow quantity of the fluid discharged from piston receiving portion 52d is small in comparison with that at the time of the quick braking manipulation, the sliding of the pressure receiving piston 171 is hardly impeded, and the brake fluid in the first pilot chamber 53 is absorbed by the brake fluid absorbing section 170 in the quantity depending on the fluid pressure in the first pilot chamber 53. Accordingly, it is possible to accurately control the pilot pressure Pa by the electromagnetic valve 42.

In the foregoing second embodiment shown in FIG. 6, the flow quantity restricting portion 279 that restricts the flow quantity of the brake fluid is provided on the passage 501 between the first pilot chamber 53 and the piston receiving portion 271 communicating with the first pilot chamber 53. Thus, when the quick braking manipulation causes the electromagnetic valve 42 to open abruptly to raise the fluid pressure abruptly in the first pilot chamber 53, the flow quantity of the fluid flowing into the piston receiving portion 271 is restricted by the flow quantity restricting portion 279. As a result, the sliding of the pressure receiving piston 272 is impeded to suppress the increase of the first pilot chamber 53 in capacity. Therefore, the pilot pressure Pa is increased immediately or in an instant, so that it is possible to generate a sufficient friction brake force at the time of an urgent braking. On the other hand, since when the braking manipulation is done gently, the restriction by the flow quantity restricting portion 279 on the flow quantity of the fluid flowing into the piston receiving portion 271 is small in comparison with that at the time of the quick braking manipulation, the sliding of the pressure receiving piston 272 is hardly impeded, and the brake fluid in the first pilot chamber 53 is absorbed by the brake fluid absorbing section 270 in the quantity depending on the fluid pressure in the first pilot chamber 53. Accordingly, it is possible to accurately control the pilot pressure Pa by the electromagnetic valve 42.

In the foregoing first embodiment typically shown in FIGS. 1 and 3, the second urging member 174 precompresses the urging member 172. Thus, since the pressure receiving piston 171 is positioned relative to the second piston 52 in the state of being in contact with the urging member 172, it does not occur that the pressure receiving piston 171 does not come into collision with the urging member 172 when the fluid pressure in the first pilot chamber 53 is heightened. Therefore, it is possible to prevent crashing sound from being generated due to the collision of the pressure receiving piston 171 against the urging member 172 and further to prevent the urging member 172 from being damaged due to the collision of the pressure receiving piston 171 against the urging member 172.

In the foregoing second embodiment shown in FIG. 6, the piston receiving portion 271 is provided outside the regulator 50. Thus, the regulator 50 can be simplified in construction and become easy in maintenance.

Obviously, numerous further modifications and variations of the present invention are possible in light of the above teachings. It is therefore to be understood that within the scope of the appended claims, the present invention may be practiced otherwise than as specifically described herein.

What is claimed is:

1. A vehicle brake device for supplying brake fluid to a wheel cylinder of a friction brake provided for a wheel of a vehicle to generate a friction brake force on the wheel by the friction brake, the vehicle brake device comprising:

a cylinder;

a master piston arranged in the cylinder slidably in an axial direction and having a pressuring piston portion defining a master chamber that pressurizes brake fluid supplied to the wheel cylinder, together with an internal surface of the cylinder and a servo pressure receiving portion defining a servo pressure chamber together with the internal surface of the cylinder;

an accumulating section that accumulates the brake fluid in a pressurized state;

an electromagnetic valve that uses the brake fluid from the accumulating section to generate a pilot pressure;

a regulator provided with a first piston that is slidably arranged in a housing and that partitions the interior of the housing into a first pilot chamber communicating with the electromagnetic valve and a servo pressure generating chamber communicating with the servo pressure chamber, and a valve mechanism that makes the servo pressure generating chamber communicate selectively with the accumulating section and a reservoir in dependence on the movement of the first piston; and a brake fluid absorbing section that communicates with the first pilot chamber and that absorbs the brake fluid of a quantity depending on the fluid pressure in the first pilot chamber.

2. The vehicle brake device according to claim 1, wherein the brake fluid absorbing section comprises:

a piston receiving portion communicating with the first pilot chamber;

a pressure receiving piston slidably received in the piston receiving portion; and an urging member that urges the pressure receiving piston toward the first pilot chamber side.

3. The vehicle brake device according to claim 2, wherein the regulator further comprises:

a second piston arranged in the housing movably toward and away from the first piston and partitioning the interior of the housing into the first pilot chamber and a second pilot chamber communicating with the master chamber; and wherein the piston receiving portion is formed in the second piston and opens to the first pilot chamber.

4. The vehicle brake device according to claim 3, further comprising:

a second urging member that urges the pressure receiving piston toward a side opposite to the first pilot chamber;

wherein the urging member is precompressed by the second urging member.

5. The vehicle brake device according to claim 2, further comprising:

a flow quantity restricting portion provided on a passage that communicates with the piston receiving portion provided on a side opposite to the first pilot chamber and that restricts the flow quantity of the fluid passing through the passage.

6. The vehicle brake device according to claim 2, further comprising:

a flow quantity restricting portion provided on a passage between the first pilot chamber and the piston receiving portion communicating with the first pilot chamber that restricts the flow quantity of the brake fluid flowing through the passage.

7. The vehicle brake device according to claim 6, wherein the piston receiving portion is provided outside the regulator.

8. The vehicle brake device according to claim 2, further comprising:

a second urging member that urges the pressure receiving piston toward a side opposite to the first pilot chamber;

wherein the urging member is precompressed by the second urging member.

* * * * *